US011772100B2

(12) United States Patent
Fujii

(10) Patent No.: US 11,772,100 B2
(45) Date of Patent: Oct. 3, 2023

(54) REAGENT CONTAINER RACK AND SPECIMEN ANALYZER

(71) Applicant: SYSMEX CORPORATION, Kobe (JP)

(72) Inventor: Takuya Fujii, Kobe (JP)

(73) Assignee: SYSMEX CORPORATION, Hyogo (JP)

( * ) Notice: Subject to any disclaimer, the term of this patent is extended or adjusted under 35 U.S.C. 154(b) by 368 days.

(21) Appl. No.: 16/574,705

(22) Filed: Sep. 18, 2019

(65) Prior Publication Data

US 2020/0101464 A1 Apr. 2, 2020

(30) Foreign Application Priority Data

Sep. 28, 2018 (JP) ................. 2018-183052

(51) Int. Cl.
*B01L 9/00* (2006.01)
*G01N 35/02* (2006.01)
*G01N 35/10* (2006.01)

(52) U.S. Cl.
CPC .............. *B01L 9/00* (2013.01); *G01N 35/026* (2013.01); *G01N 35/1002* (2013.01); *B01L 2200/16* (2013.01); *B01L 2300/042* (2013.01); *B01L 2300/0663* (2013.01); *B01L 2300/0858* (2013.01); *B01L 2300/123* (2013.01)

(58) Field of Classification Search
CPC ...... B01L 2300/123; B01L 3/523; B01L 9/00; B01L 2200/142; B01L 2200/0689; B01L 2200/16; B01L 2300/0663; B01L 2300/042; B01L 2300/0858; G01N 35/1002; G01N 2035/00287; G01N 35/026; G01N 2035/00435; G01N 2035/0405; G01N 35/109
See application file for complete search history.

(56) References Cited

U.S. PATENT DOCUMENTS 8,491,854 B2 * 7/2013 Al-Rasheed ........... C12M 23/08
422/549
9,365,334 B2 * 6/2016 Christopoulos .... B65D 43/0225
9,527,661 B2 * 12/2016 Fu ........................ B65D 65/466
9,687,849 B2 * 6/2017 Bruno ................ B65D 43/0225
9,827,585 B2 * 11/2017 Bintig .................... B65D 47/42
(Continued)

FOREIGN PATENT DOCUMENTS

CN     102192992 A    9/2011
CN     105593687 A    5/2016
(Continued)

OTHER PUBLICATIONS

Extended European search report dated Dec. 19, 2019 in a counterpart European patent application No. 19199221.3.
(Continued)

*Primary Examiner* — Shogo Sasaki
(74) *Attorney, Agent, or Firm* — Crowell & Moring LLP

(57) ABSTRACT

Disclosed is a reagent container rack used in a specimen analyzer configured to analyze a specimen by use of a reagent. The reagent container rack includes a holder configured to hold a reagent container that contains the reagent; and a lid configured to cover a mouth portion of the reagent container to form an airtight space between the lid and the mouth portion.

15 Claims, 12 Drawing Sheets

(56) References Cited

U.S. PATENT DOCUMENTS

| | | | |
|---|---|---|---|
| 2005/0086830 A1 | 4/2005 | Zukor et al. | |
| 2006/0120922 A1 | 6/2006 | Matsumoto | |
| 2007/0175853 A1* | 8/2007 | Kebben | B65D 41/0414 |
| | | | 215/354 |
| 2007/0272698 A1* | 11/2007 | Brown | B65D 83/0005 |
| | | | 220/578 |
| 2011/0030134 A1* | 2/2011 | Dubiel | A47K 11/06 |
| | | | 4/237 |
| 2012/0329143 A1 | 12/2012 | Yamazaki et al. | |
| 2013/0064735 A1 | 3/2013 | Arras et al. | |
| 2014/0158688 A1* | 6/2014 | Loughrin | B65D 41/185 |
| | | | 53/490 |
| 2014/0202979 A1 | 7/2014 | Kosenka | |
| 2017/0176482 A1 | 6/2017 | Fujii et al. | |
| 2017/0239651 A1 | 8/2017 | Higgins | |

FOREIGN PATENT DOCUMENTS

| | | |
|---|---|---|
| CN | 107037223 A | 8/2017 |
| EP | 3182135 A1 | 6/2017 |
| EP | 3605105 A1 | 2/2020 |
| JP | S63-52765 U | 4/1988 |
| JP | H11-304805 A | 11/1999 |
| JP | 2003-329688 A | 11/2003 |
| JP | 2007-205723 A | 8/2007 |
| JP | 2008-96195 A | 4/2008 |
| JP | 2008-296940 A | 12/2008 |
| JP | 2009-121993 A | 6/2009 |
| JP | 2009-156808 A | 7/2009 |
| JP | 2011-13235 A | 1/2011 |
| JP | 2013-524190 A | 6/2013 |
| JP | 2017-111050 A | 6/2017 |
| JP | 6771519 B2 | 10/2020 |
| WO | 2011/121030 A1 | 10/2011 |
| WO | 2018/173464 A1 | 9/2018 |

OTHER PUBLICATIONS

Japanese Office Action dated Jan. 28, 2020 in a counterpart Japanese patent application No. 2018-183052.

Decision of Refusal dated Apr. 21, 2020 in a counterpart Japanese patent application No. 2018-183052.

Japanese Office Action dated Jun. 7, 2022 in Japanese patent application No. 2020-055616.

European Examination Report dated Aug. 18, 2022, pp. 1-5, in European patent application No. 19199221.3, European Patent Office, Rijswijk, The Netherlands.

Communication pursuant to Article 94(3) EPC dated Jul. 24, 2023 in a counterpart European patent application No. 19199221.3.

Chinese office action dated Jul. 5, 2023 in a counterpart Chinese patent application No. 20191093417.4.

* cited by examiner

REAGENT CONTAINER RACK AND SPECIMEN ANALYZER

RELATED APPLICATIONS

This application claims priority from prior Japanese Patent Application No. 2018-183052, filed on Sep. 28, 2018, entitled "Reagent Container Rack and Specimen Analyzer", the entire content of which is incorporated herein by reference.

BACKGROUND OF THE INVENTION

1. Field of the Invention

The present invention relates to a reagent container rack and a specimen analyzer including the reagent container rack.

2. Description of the Related Art

Conventionally, specimen analyzers for analyzing specimens by use of reagents have been known. In a specimen analyzer, since a reagent is sucked from a reagent container by a suction tube or the like, the reagent container containing the reagent is placed, in its unsealed state, in the specimen analyzer. Since the reagent container is placed in its unsealed state, the reagent inside the container may be evaporated and may adversely affect analysis performance.

As a method for reducing evaporation of a reagent, a lid, which is attached to a mouth portion of a reagent container to inhibit evaporation of the reagent, has been known (refer to Japanese Patent No. 4829624, for example). Japanese Patent No. 4829624 discloses a reagent container lid body 900 including a fitting tubular portion 901 to be fitted in a reagent container; a flange 902 that comes into contact with a mouth portion of the reagent container when the lid body 900 is attached to the reagent container; a deformable lid portion 903 that is disposed on an inner circumferential surface of the flange 902 so as to cover an opening of the reagent container; and an opening 904, formed in the center of the lid portion 903, which receives a suction tool. With the reagent container lid body 900, the lid portion 903 partially covers the opening of the reagent container to inhibit evaporation of the reagent. In the reagent container lid body 900, slits 905 make the lid portion 903 deformable. Therefore, even if the suction tool comes into contact with the lid portion 903 when being inserted in the opening 904, the deformed lid portion 903 does not hinder the suction operation.

In the reagent container lid body 900 disclosed in Japanese Patent No. 4829624, however, since the inside of the reagent container is opened through the opening 904, evaporation of the reagent in the reagent container cannot be sufficiently inhibited. In addition, for reasons such as the reagent container lid body 900 being in direct contact with the mouth portion of the reagent container, and the suction tool to which the reagent is adhered being likely to come into contact with the lid portion 903, if the reagent container lid body 900 having once been used is attached to another reagent container, reagent contamination may occur. In order to avoid the risk of contamination, the lid body should be made disposable or sufficient washing should be performed before the lid body is attached to another reagent container.

Therefore, from the viewpoint of convenience of users, it is desired to sufficiently inhibit evaporation of a reagent even when an unsealed reagent container is kept placed in a specimen analyzer, and to inhibit the risk of contamination so that a lid can be reused even when the reagent container is replaced with a new one.

SUMMARY OF THE INVENTION

The scope of the present invention is defined solely by the appended claims, and is not affected to any degree by the statements within this summary.

A reagent container rack (100) according to a first aspect of the present invention is a reagent container rack (100) used in a specimen analyzer (200) configured to analyze a specimen by use of a reagent. The reagent container rack (100) includes a holder (10) configured to hold a reagent container (90) that contains the reagent; and a lid (20) configured to cover a mouth portion (91) of the reagent container (90) such that an airtight space (CS) is formed between the lid (20) and the mouth portion (91).

In the reagent container rack (100) according to the first aspect, the above configuration allows the airtight space (CS) to be formed by the reagent container (90) and the lid (20) that covers the mouth portion (91) of the reagent container (90), and allows the mouth portion (91) to be disposed in the airtight space (CS). Thus, the inside of the reagent container (90) is communicated with only the airtight space (CS) via the mouth portion (91), and is isolated from the outside of the lid (20). As a result, the reagent contained in the reagent container (90) is inhibited from being unlimitedly evaporated to the outside, thereby effectively inhibiting evaporation of the reagent even when an unsealed reagent container is placed in the specimen analyzer. Further, even when the lid (20) covers the mouth portion (91), the airtight space (CS) is formed between the lid (20) and the mouth portion (91). Therefore, the reagent is inhibited from adhering to the lid (20) via the mouth portion (91) to which the reagent is likely to adhere. As a result, even if the reagent container (90) covered with the lid (20) is replaced with another reagent container (90), the risk of reagent contamination can be inhibited.

In the reagent container rack (100) according to the first aspect, preferably, the mouth portion (91) is a portion to be exposed when a cap (95), which has been attached in advance to the sealed reagent container, is removed to unseal the reagent container (90). A reagent container (90), which is sealed and covered with a sealing cap (95) at a mouth portion (91), is offered for sale or the like. The reagent container (90), which has been unsealed by removing the cap (95), is set in the reagent container rack (100) and placed in the specimen analyzer (200). Since the reagent in the reagent container (90) may be adhered to the cap (95) that seals the reagent container (90) in advance, the reagent may be adhered to the portion covered with the cap (95). Therefore, according to the above configuration, the lid (20), which covers the mouth portion (91) while forming the airtight space (CS) between itself and the mouth portion (91) covered with the cap (95), can further reduce the risk of adhesion of the reagent to the lid (20). Therefore, when the reagent container (90) set in the reagent container rack (100) is replaced with another reagent container, the risk of reagent contamination via the lid (20) can be effectively inhibited.

In the reagent container rack (100) according to the first aspect, preferably, the mouth portion (91) is a portion including an opening end surface (91a) in which an opening of the reagent container (90) is formed; and an engagement portion (91b) that is engaged with the cap (95) attached to the sealed reagent container (90) in advance. The lid (20)

covers the mouth portion (91) so as to form the airtight space (CS) between the opening end surface (91a) and the engagement portion (91b) of the mouth portion (91). In this configuration, the lid (20) covers, via the airtight space (CS), not only the opening end surface (91a) to which the reagent is likely to adhere via the suction tube (121) when the reagent is sucked, but also the engagement portion (91b) to which the reagent is likely to adhere via the cap (95) that seals the reagent container (90) in advance. Therefore, the risk of adhesion of the reagent to the lid (20) can be effectively reduced.

In this case, the engagement portion (91b) of the mouth portion (91) is a screw portion that is engaged with the cap (95).

In the reagent container rack (100) according to the first aspect, preferably, the lid (20) is configured to cover the mouth portion (91) without being in contact with the mouth portion (91). This configuration can prevent the lid (20) from being in contact with the mouth portion (91) while covering the mouth portion (91). Thus, reagent contamination can be inhibited more reliably.

In this case, preferably, the lid (20) has a top plate (surface) (21) and a tubular side wall (22) extending from the top plate (21) toward the holder (10), and the side wall (22) has an inner shape whose internal diameter is greater than an external diameter of the mouth portion (91). In this configuration, a clearance between a peripheral edge of the mouth portion (91) and the side wall (22) can be ensured. Therefore, not only the contact between the mouth portion (91) and the top plate (21) but also the contact between the lid (20) and the peripheral edge of the mouth portion (91) can be avoided, whereby reagent contamination can be inhibited more reliably.

In the configuration where the lid (20) has the top plate (21) and the side wall (22), preferably, the lid (20) covers the mouth portion (91) so as to form the airtight space (CS) between the lid (20) and the mouth portion (91) when the side wall (22) comes into contact with an outer surface of the reagent container (90) around the mouth portion (91). In this configuration, airtightness of the airtight space (CS) formed inside the lid (20) can be enhanced through the contact between the side wall (22) and the outer surface of the reagent container (90), while avoiding the contact between the lid (20) and the mouth portion (91). As a result, evaporation of the reagent can be effectively inhibited.

In this case, preferably, the side wall (22) is formed such that an end portion (22a) thereof comes into contact with an outer surface of an intermediate portion (94) that connects the mouth portion (91) of the reagent container (90) to a trunk portion (92), of the reagent container (90), having an outer diameter greater than that of the mouth portion (91). In this configuration, the outer diameter of the reagent container (90) is increased at the intermediate portion (94) provided between the mouth portion (91) and the trunk portion (92). Therefore, it is possible to form an airtight space (CS) as long as the reagent container (90) has an outer diameter greater than that of the side wall (22) when the end portion (22a) of the side wall (22) is brought into contact with the intermediate portion (94). Therefore, it is possible to easily ensure a range of sizes of reagent containers (90) for which the lid (20) can be used.

In the configuration where the end portion (22a) of the side wall (22) comes into contact with the intermediate portion (94) of the reagent container (90), preferably, the side wall (22) has a contact portion (23) that is formed of an elastic material and comes into contact with the reagent container (90). At the end portion (22a), the contact portion (23) is formed in an annular shape along the end portion (22a). In this configuration, elastic deformation of the contact portion (23) allows the contact portion (23) at the end portion (22a) of the side wall (22) to adhere to the reagent container (90). Thus, airtightness of the airtight space (CS) formed inside the lid (20) can be further enhanced, whereby evaporation of the reagent can be inhibited more effectively.

In the configuration where the side wall (22) is in contact with the outer surface of the reagent container (90) around the mouth portion (91), preferably, the side wall (22) is formed such that an inner peripheral surface (22b) thereof comes into contact with at least one of a trunk portion (92), of the reagent container (90), having an outer diameter greater than that of the mouth portion (91) of the reagent container (90); and an intermediate portion (94) that connects the mouth portion (91) to the trunk portion (92). In this configuration, even when the outer diameter of the reagent container (90) is small, the airtight space (CS) can be formed when the inner peripheral surface (22b) of the side wall (22) comes into contact with the reagent container (90).

In this case, preferably, the side wall (22) has a contact portion (23) that is formed of an elastic material and comes into contact with the reagent container (90), and the contact portion (23) is provided so as to project from the inner peripheral surface (22b) of the side wall (22) toward the center of the side wall (22). In this configuration, elastic deformation of the contact portion (23) allows the contact portion (23) at the inner peripheral surface (22b) of the side wall (22) to adhere to the reagent container (90). Thus, airtightness of the airtight space (CS) formed inside the lid (20) can be further enhanced, whereby evaporation of the reagent can be inhibited more effectively. Further, since the contact portion (23) is elastically deformed, it is possible to easily ensure a range of sizes of reagent containers (90) for which the lid (20) can be used.

In the configuration where the side wall (22) has the contact portion (23) formed of an elastic material, preferably, the contact portion (23) is formed of a sealing member that comes into contact with the reagent container (90) to hermetically seal the airtight space (CS). The sealing member as the contact portion (23) is a member having elasticity enough for adhesion to the reagent container (90) and sealing performance (low gas permeability) enough for intended use. Thus, the sealing member adhered to the reagent container (90) allows the space between the lid (20) and the reagent container (90) to be hermetically sealed more reliably.

In the configuration where the side wall (22) has the contact portion (23) formed of an elastic material, preferably, an engagement portion (41), which is engaged with the lid (20) and holds the lid (20) in a state where the contact portion (23) is pressed against the reagent container (90) held in the holder (10), is further provided. In this configuration, when the lid (20) is engaged with the engagement portion (41), the contact portion (23) can be kept elastically deformed to be pressed against and adhered to the reagent container (90). Thus, the airtight space (CS) formed inside the lid (20) can be easily kept hermetically sealed.

Preferably, the reagent container rack (100) according to the first aspect further includes a support portion (30) that connects the holder (10) to the lid (20). According to this configuration, it is possible to obtain a single reagent container rack (100) including a holder (10) and a lid (20) which are not individual components separated from each other but are connected to each other via the support portion (30). Thus, it is not necessary to individually manage the respective components, which makes handling of the reagent container rack (100) easy. Thus, convenience of the user can be enhanced.

In the reagent container rack (100) according to the first aspect, preferably, the support portion (30) connects the holder (10) and the lid (20) at positions apart from each other such that a front surface and a side surface of the reagent container (90) is exposed between the holder (10) and the lid (20). There are cases where the specimen analyzer (200) stores the reagent container (90) at a temperature different from room temperature. Thus, if the greater part of the reagent container (90) is covered with the lid and the holder of the reagent container rack (100), heat transfer is impeded, which causes the reagent in the reagent container (90) to be delayed in reaching a set temperature. Meanwhile, in the reagent container rack configured as described above, a wide area of the reagent container (90) is exposed to the outside from the reagent container rack (100) in the space outside the lid (20) while the lid (20) covers the mouth portion (91) of the reagent container (90), thereby inhibiting heat transfer from being impeded. As a result, the temperature of the reagent in the reagent container (90) is allowed to quickly reach the set temperature while inhibiting evaporation of the reagent.

In the configuration having the support portion (30), preferably, the support portion (30) supports the lid (20) such that the lid (20) is movable to a closed position (P1) at which the lid (20) convers the mouth portion (91) of the reagent container (90) and to an opened position (P2) at which mounting and removal of the reagent container (90) to/from the holder (10) is allowed. In this configuration, even when the holder (10) and the lid (20) are connected via the support portion (30), mounting and replacement of the reagent container (90) to the holder (10) can be easily performed by moving the lid (20), whereby convenience of the user can be enhanced.

In this case, the support portion (30) may be connected to the lid (20) via a first hinge (31) that allows the lid (20) to pivot between the closed position (P1) and the opened position (P2).

In the configuration where the support portion (30) is connected to the lid (20) via the first hinge (31), preferably, the lid (20) has an insertion port (24) for insertion of a suction tube (121) that sucks the reagent, and an openable/closable cover portion (25) that closes the insertion port (24). In this configuration, suction of the reagent using the suction tube (121) can be performed with the cover portion (25) being opened while the lid (20) is located at the closed position (P1) to cover the mouth portion (91). Therefore, as compared to the configuration in which the whole lid (20) is moved to the opened position (P2) when suction of the reagent is performed, the inside of the reagent container (90) is inhibited from being opened to the outside, thereby inhibiting evaporation of the reagent.

In this case, preferably, the cover portion (25) is pivotally connected to the lid (20) via a second hinge (26) so as to open and close the insertion port (24). This configuration allows the insertion port (24) to be easily opened and closed by only pivoting the cover portion (25).

In the configuration where the cover portion (25) is pivotable via the second hinge (26), preferably, an urging member (27) configured to urge the cover portion (25) toward the insertion port (24) is further provided. In this configuration, the urging force from the urging member (27) can enhance airtightness in the state where the cover portion (25) is closed.

In the configuration where the cover portion (25) is pivotable via the second hinge (26), preferably, the cover portion (25) is provided so as to pivot around the second hinge (26), which is disposed at a position nearer to a distal end of the lid (20) relative to the first hinge (31) of the lid (20), when a to-be-pressed part (25b) is pressed toward the holder (10). The "distal end of the lid" means a distal end in the radial direction around the first hinge. In this configuration, when the to-be-pressed part (25b) is pressed toward the holder (10) to open the cover portion (25), the pressing force can be caused to act in the direction in which the lid (20) is rotated around the first hinge (31) toward the holder (10). Thus, even when the cover portion (25) is opened and closed, airtightness between the lid (20) and the reagent container (90) is not reduced.

The reagent container rack (100) according to the first aspect preferably includes a plurality of holders (10), and the lid (20) is provided so as to cover the mouth portion (91) of the reagent container (90) that is held by at least one of the plurality of holders (10). In this configuration, for example, when a plurality of reagents are used for one measurement item, reagent containers (90) to be used can be collectively set in the same reagent container rack (100), thereby enhancing convenience of the user. There are some reagents that will not affect the analysis results even when the concentrations thereof are changed due to evaporation. Such reagents are not necessarily inhibited from being evaporated by use of the lid (20). Therefore, in the above configuration, a lid (20) is provided to a reagent container (90) that needs inhibition of reagent evaporation while no lid (20) is provided to a reagent container (90) that does not need inhibition of reagent evaporation. Therefore, in a holder (10) having no lid (20), mounting and replacement of a reagent container (90) can be simplified.

In the reagent container rack (100) according to the first aspect, preferably, the holder (10) includes a mounting portion (11) that supports a bottom portion (93) of the reagent container (90), and a lateral portion (12) that opposes an outer peripheral surface of the reagent container (90). In this configuration, the reagent container (90) is stably supported by the mounting portion (11), and positional shift of the reagent container (90) is inhibited by the lateral portion (12).

In this case, preferably, the mounting portion (11) of the holder (10) has an inclined mounting surface (11a) on which the reagent container (90) is to be mounted, and the lid (20) is configured to form the airtight space (CS) between the lid (20) and the inclined mouth portion (91). In this configuration, the reagent container (90) is inclined, and the reagent can be collected in the lowest portion of the reagent container (90). Thus, even when the remaining amount of the reagent is small, the collected reagent can be sucked, thereby reducing the dead volume of the reagent. Even when the reagent container (90) is inclined as described above, evaporation of the reagent can be inhibited by covering the mouth portion (91) with the lid (20), whereby the reagent can be effectively used as much as possible while inhibiting change in concentration due to evaporation.

In this case, preferably, the mounting portion (11) is configured as a replacement component that supports, in the holder (10), the bottom portion (93) of the reagent container (90) at a predetermined height and a predetermined angle, and that is attachable to and detachable from the holder (10). In this configuration, reagent containers (90) having different dimensions can be disposed at the same height or can be held at optimum inclination angles.

In the reagent container rack (100) according to the first aspect, the reagent in the reagent container (90) may be a reagent for blood coagulation analysis.

A reagent container rack according to a second aspect of the present invention is a reagent container rack used in a specimen analyzer configured to analyze a specimen by use of a reagent. The reagent container rack includes a holder configured to hold a reagent container that contains the reagent, the reagent container comprising a mouth portion which protrudes upwards from an upper surface of the reagent container, an opening being formed at an upper end of the mouth portion; a lid configured to cover the mouth portion of the reagent container and comprising a top surface and a tubular side wall extending downwards from the top surface, wherein an internal diameter of the side wall is greater than an external diameter of the mouth portion; and a support portion that connects the holder and the lid, and is configured to move the lid to bring a lower end of the side wall into contact with the upper surface of the reagent container around the mouth portion.

The lid may be formed so as to have a gap between an inner surface of the lid and an outer surface of the mouth portion when the lower end of the side wall is in contact with the upper surface of the reagent container around the mouth portion.

The lower end of the side wall may be formed of an elastic material, and may be formed in an annular shape.

A specimen analyzer (200) according to a third aspect of the present invention includes any one of the reagent container racks (100) according to the first aspect or the second aspect; an open/close mechanism (110) configured to open and close the lid (20) of the reagent container rack (100); a reagent dispenser (120) configured to dispense the reagent in the reagent container (90) set in the reagent container rack (100); a detection unit (130) configured to detect a signal based on a measurement sample containing a specimen and a reagent; and an analysis unit (140) configured to analyze the specimen on the basis of the signal detected by the detection unit (130).

The specimen analyzer (200) according to the third aspect is provided with the reagent container rack (100) according to the first aspect or the second aspect. Therefore, even when an unsealed reagent container is placed in the specimen analyzer, evaporation of the reagent can be effectively inhibited. In addition, even when the reagent container (90) covered with the lid (20) is replaced with another reagent container (90), the risk of reagent contamination can be inhibited.

In the specimen analyzer (200) according to the third aspect, preferably, the lid (20) of the reagent container rack (100) has an insertion port (24) for insertion of a suction tube (121) that sucks a reagent, and an openable/closable cover portion (25) configured to close the insertion port (24). The open/close mechanism (110) opens and closes the lid (20) by moving the cover portion (25) so as to open and close the insertion port (24), when the suction tube (121) of the reagent dispenser (120) sucks the reagent from the reagent container (90). In this configuration, suction of the reagent with the suction tube (121) can be performed by locally opening only the insertion port (24) by use of the open/close mechanism (110) while the airtight space (CS) is formed between the lid (20) of the reagent container rack (100) and the mouth portion (91). Therefore, as compared to the configuration in which the whole lid (20) is removed from the reagent container (90) to open the mouth portion (91) when suction of the reagent is performed, the inside of the reagent container (90) is inhibited from being opened to the outside, thereby inhibiting evaporation of the reagent.

DETAILED DESCRIPTION OF THE PREFERRED EMBODIMENTS

Figure 1:
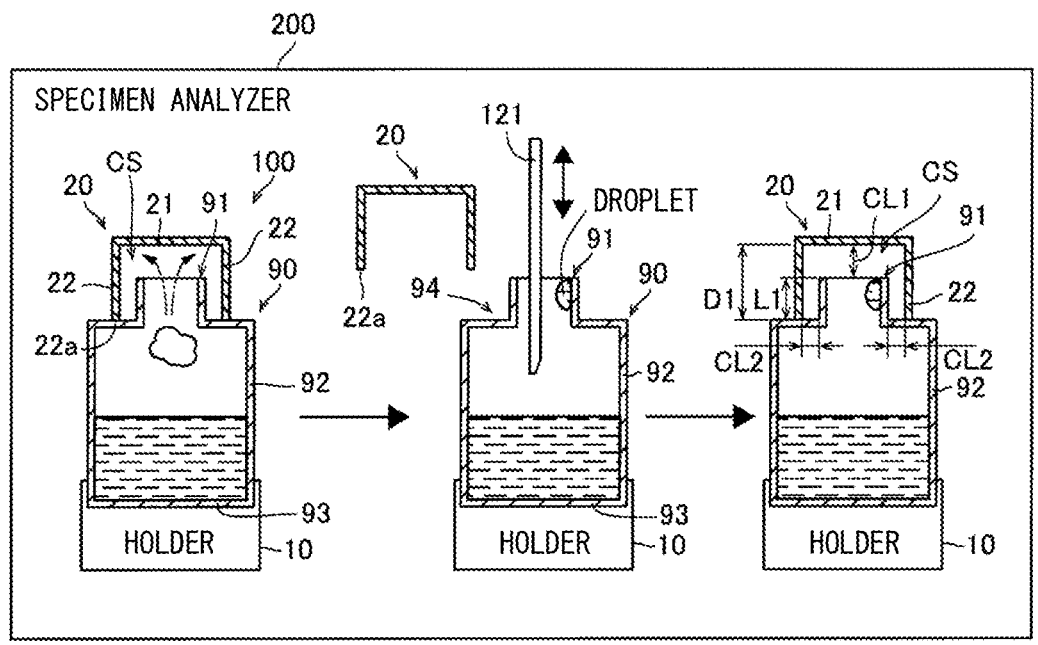
FIG. 1 is a diagram showing the outline of a reagent container rack.

Hereinafter, embodiments of the present invention will be described with reference to the drawings.

[Outline of Reagent Container Rack]

First, the outline of a reagent container rack 100 according to one embodiment will be described with reference to FIG. 1.

The reagent container rack 100 is a reagent container rack used in a specimen analyzer 200 for analyzing a specimen by use of a reagent. The reagent container rack 100 is placed in the specimen analyzer 200, and holds at least one reagent container 90. The reagent container 90 is in its unsealed state when being held by the reagent container rack 100. For example, a user sets the unsealed reagent container 90 in the reagent container rack 100, and places the reagent container rack 100 at a predetermined position in the specimen analyzer 200. The specimen analyzer 200, by use of a suction tube 121 or the like, can suck the reagent from the inside of the reagent container 90 that is held in the reagent container rack 100. Analysis of the specimen is performed by use of the sucked reagent. The reagent container 90 contains a sufficient amount of the reagent to perform specimen analysis a predetermined number of times. When the reagent has been consumed and the reagent container 90 has been emptied or when the expiration date for use of the reagent container 90 has passed after unsealing and the reagent therein has become unusable anymore, the reagent container 90 is removed from the reagent container rack 100 and replaced with a new reagent container 90 if specimen analysis will be continued.

The reagent container 90 contains a reagent therein. The reagent container 90 is a tubular container capable of containing liquid. The reagent container 90 has: a mouth portion 91 in which an opening serving as a liquid inlet/outlet is formed; and a tubular trunk portion 92 that separates a space where the reagent is contained. The mouth portion 91 has an end surface at which the opening connecting the inner space of the reagent container 90 to the outside is exposed. A lower end of the trunk portion 92 is sealed by a bottom portion 93, and an upper end of the trunk portion 92 communicates with the mouth portion 91. The reagent container 90 generally has a cylindrical shape with a circular horizontal cross section. The reagent container 90 may have any tubular shape, other than a cylindrical shape, such as a square tubular shape. In the following, for convenience, the reagent container 90 is a tubular container having a circular horizontal cross section.

The outer shape of the trunk portion 92 in the horizontal cross section is not particularly limited, but is generally greater than the outer shape of the mouth portion 91 in the horizontal cross section. The reagent container 90 may have an intermediate portion 94 that connects the trunk portion 92 and the mouth portion 91 whose outer shapes in the horizontal cross section have different sizes. The intermediate portion 94 connects an upper end portion of the trunk portion 92 and a lower end portion of the mouth portion 91. In the intermediate portion 94, the outer shape of the reagent container 90 in the horizontal cross section is changed from a shape that matches the mouth portion 91 to a shape that matches the upper end portion of the trunk portion 92. In the intermediate portion 94, the outer shape of the reagent container 90 may be continuously changed from the mouth portion 91 toward the trunk portion 92. Alternatively, as shown in FIG. 1, the outer shape of the reagent container 90 may be discontinuously changed at a predetermined position.

The reagent is liquid. For example, the reagent is an aqueous solution that contains a component according to an analysis item of the specimen analysis. For example, the reagent reacts with the component contained in the specimen when being mixed with the specimen in the specimen analyzer 200. The component concentration of the reagent may be changed due to evaporation of moisture, and the concentration change may affect the analysis of the specimen analyzer 200.

The reagent container rack 100 according to the present embodiment includes a holder 10 and a lid 20.

The holder 10 is a member for holding a reagent container 90 that contains a reagent. The holder 10 is in contact with a part of the reagent container 90 to support the reagent container 90, thereby keeping the position of the reagent container 90 in the reagent container rack 100. The holder 10 supports the bottom portion 93 of the reagent container 90, for example. The holder 10 grips, for example, the opposed lateral surfaces of the reagent container 90. The holder 10 is engaged with, for example, a flange-like portion of the reagent container 90 and holds the reagent container 90 in a suspended manner.

The lid 20 is configured to cover the mouth portion 91 such that an airtight space CS is formed between itself and the mouth portion 91 of the reagent container 90. The lid 20 is configured to surround and cover the periphery of the mouth portion 91 of the reagent container 90. The lid 20 is formed of a resin material, a metal material, or the like. The lid 20 has a thickness enough to prevent gas from penetrating therethrough. The lid 20 is in contact with the outer surface at the periphery of the mouth portion 91 of the reagent container 90 to form the airtight space CS. The airtight space CS is a space surrounded by the lid 20 and the surface of the reagent container 90. The airtight space CS is formed so as to include the mouth portion 91 therein. Since the airtight space CS is formed between the lid 20 and the mouth portion 91, the surface of the lid 20 is apart from the mouth portion 91. That is, the lid 20 is provided so as to cover an area including the mouth portion 91 while being apart from the mouth portion 91 corresponding to the end surface at which the opening of the reagent container 90 is formed.

The airtight space CS communicates with the inner space of the reagent container 90 via the mouth portion 91. The airtight space CS and the inner space of the reagent container 90 are isolated from the outside by the lid 20 and the reagent container 90. The lid 20 and the surface of the reagent container 90 restrict flow of gas between the inside and the outside of the airtight space CS. Therefore, only an extremely small quantity of the reagent in the reagent container 90 is evaporated and discharged into the inner space of the reagent container 90 and the airtight space CS. The airtight space CS may not be "airtight" in the strict sense. At a contact part of the lid 20 to the reagent container 90, presence of a slight clearance, which is inevitably formed due to minute unevenness or change in the surface shape, is allowed.

The lid 20 is provided so as to come into contact with the reagent container 90 held by the holder 10 and form the airtight space CS between itself and the mouth portion 91. When suction of the reagent is performed in the specimen analyzer 200, for example, the lid 20 is moved from the position where the lid 20 forms the airtight space CS, whereby the mouth portion 91 is opened to the outside. Through the mouth portion 91 opened to the outside, the suction tube 121 enters the reagent container 90, and the reagent in the reagent container 90 is sucked by the suction tube 121. When the suction of the reagent has ended and the suction tube 121 has been moved to the outside of the reagent container 90, the lid 20 is moved to the position where the lid 20 forms the airtight space CS. For example, when the suction tube 121 is moved to the outside of the reagent container 90, droplets of the reagent may be adhered to the mouth portion 91 and its vicinity. Since a clearance is formed between the lid 20 and the mouth portion 91 while the airtight space CS is formed, adhesion of droplets to the lid 20 is inhibited. Also, when the reagent container 90 set in the reagent container rack 100 is replaced with another reagent container 90, since the lid 20 covers the mouth portion 91 so as to form the airtight space CS between itself and the mouth portion 91, droplets in the reagent container 90 are inhibited from moving into the new reagent container 90 via the lid 20.

As described above, in the reagent container rack 100 according to the present embodiment, the airtight space CS is formed by the reagent container 90 and the lid 20 that covers the mouth portion 91 of the reagent container 90, and the mouth portion 91 can be placed in the airtight space CS. Thus, the inside of the reagent container 90 only communicates with the airtight space CS via the mouth portion 91 and therefore can be isolated from the outside of the lid 20.

As a result, the reagent contained in the reagent container 90 is inhibited from unlimitedly evaporating to the outside. Thus, even in the state where the unsealed reagent container 90 is placed in the specimen analyzer 200, evaporation of the reagent can be effectively inhibited. Further, even when the lid 20 covers the mouth portion 91, the airtight space CS is formed between the lid 20 and the mouth portion 91. Therefore, the reagent is prevented from being adhered to the lid 20 via the mouth portion 91 to which the reagent is likely to adhere. As a result, even when the reagent container 90 covered with the lid 20 is replaced with another reagent container 90, the risk of reagent contamination can be inhibited.

(Configuration Example of Lid)

In the configuration example shown in FIG. 1, the lid 20 is configured to cover the mouth portion 91 without being in contact with the mouth portion 91. In FIG. 1, the lid 20 covers the mouth portion 91 so as to form a clearance between itself and the mouth portion 91. In FIG. 1, the lid 20 covers the mouth portion 91 with a clearance CL1 above the mouth portion 91 and a clearance CL2 lateral to the mouth portion 91. Thus, the lid 20, covering the mouth portion 91, is prevented from coming into contact with the mouth portion 91, thereby inhibiting reagent contamination more reliably.

In the configuration example shown in FIG. 1, the lid 20 has a top plate 21, and a tubular side wall 22 extending from the top plate 21 toward the holder 10 side. The top plate 21 covers the upper part of the mouth portion 91. The top plate 21 may form an upper surface of the lid 20. The side wall 22 covers the mouth portion 91 so as to surround the periphery of the mouth portion 91. The side wall 22 is formed in a tubular shape that surrounds the periphery of the mouth portion 91. The top plate 21 and the tubular side wall 22 of the lid 20 form a recessed inner space in which the mouth portion 91 can be accommodated. When the inner space of the lid 20 is closed as the lid 20 comes into contact with the reagent container 90, the airtight space CS is formed. For example, the lid 20 may have a shape, such as a hemispherical shell-like shape, which cannot be separated into a top plate 21 and a side wall 22.

The shape of the top plate 21 as viewed from above is greater than the outer shape of the mouth portion 91 of the reagent container 90. That is, the peripheral edge of the top plate 21 is disposed outward relative to the peripheral edge of the mouth portion 91. In the state where the lid 20 covers the mouth portion 91, the top plate 21 is disposed at a position separated by the clearance CL1 upward from the mouth portion 91. In FIG. 1, the top plate 21 has a flat shape. The top plate 21 may be formed in a non-flat shape, such as a curved shape. In FIG. 1, the top plate 21 extends in the horizontal direction to form the upper surface of the lid 20. The top plate 21 may be inclined.

In the state where the lid 20 covers the mouth portion 91 of the reagent container 90, the side wall 22 extends from the top plate 21 toward the holder 10. In the example shown in FIG. 1, the side wall 22 extends downward from the lower surface of the top plate 21. In the example shown in FIG. 1, the side wall 22 extends from the peripheral edge of the top plate 21. The side wall 22 may extend from an inward position relative to the peripheral edge of the top plate 21. In the example shown in FIG. 1, a length D1 in the up-down direction from the contact position between the lid 20 and the reagent container 90 to the top plate 21 is greater than a distance L1 in the up-down direction from the contact position between the lid 20 and the reagent container 90 to the mouth portion 91.

The tubular side wall 22 is configured such that the mouth portion 91 of the reagent container 90 can be disposed inside the side wall 22 in a horizontal plane. That is, the inner shape of the side wall 22 is greater than the outer shape of the mouth portion 91. The inner shape is a contour shape of an inner peripheral surface of the tubular side wall 22 in a horizontal cross section. When the side wall 22 has a cylindrical shape, the inner diameter of the side wall 22 is greater than the outer diameter of the mouth portion 91. Therefore, in the state where the lid 20 covers the mouth portion 91, the side wall 22 is disposed at a position lateral to and separated by the clearance CL2 from the mouth portion 91.

Thus, a clearance between the side wall 22 and the peripheral edge of the mouth portion 91 can be ensured. Therefore, not only the contact between the mouth portion 91 and the top plate 21 but also the contact between the lid 20 and the peripheral edge of the mouth portion 91 can be avoided, whereby reagent contamination can be inhibited more reliably.

In the example shown in FIG. 1, the lid 20 covers the mouth portion 91 so as to form the airtight space CS between the lid 20 and the mouth portion 91 through the contact of the side wall 22 to the outer surface of the reagent container 90 except for the mouth portion 91 of the reagent container 90. Thus, airtightness of the airtight space CS formed inside the lid 20 can be enhanced through the contact between the side wall 22 and the outer surface of the reagent container 90 while avoiding the contact of the lid 20 to the mouth portion 91. As a result, evaporation of the reagent can be effectively inhibited.

In the example shown in FIG. 1, the side wall 22 is formed such that an end portion 22a of the side wall 22 comes into contact with the outer surface of the intermediate portion 94 that connects the mouth portion 91 of the reagent container 90 to the trunk portion 92 whose outer shape is greater than the mouth portion 91. That is, the inner diameter of the side wall 22 is greater than the outer diameter of the mouth portion 91 and smaller than the outer diameter of the trunk portion 92. Therefore, the end portion 22a of the side wall 22 comes into contact with the flat intermediate portion 94 of the reagent container 90 from above.

As described above, the outer diameter of the reagent container 90 is increased at the intermediate portion 94 provided between the mouth portion 91 and the trunk portion 92. Therefore, it is possible to form an airtight space CS as long as the reagent container 90 has an outer diameter greater than that of the side wall 22 when the end portion 22a of the side wall 22 is brought into contact with the intermediate portion 94. That is, the lid 20 can form an airtight space CS with any reagent container 90 in which the outer diameter of the trunk portion 92 is greater than the inner diameter of the side wall 22. Therefore, it is possible to easily ensure a range of sizes of reagent containers 90 for which the lid 20 can be used.

Figure 2A:
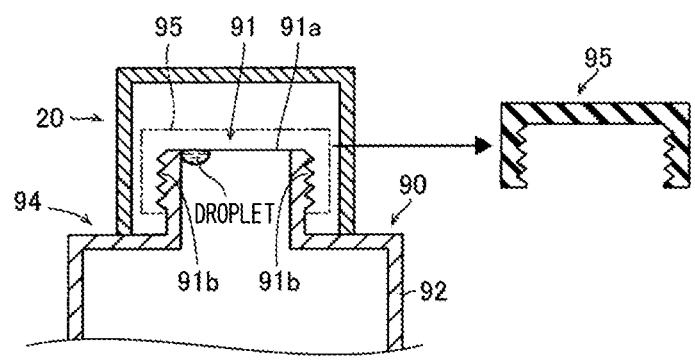
FIG. 2A is an enlarged view of a mouth portion.

Although depicted in a simplified manner in FIG. 1, as shown in FIG. 2A, the mouth portion 91 may be a portion to be exposed when a cap 95, which has been attached to a sealed reagent container 90 in advance, is removed to unseal the reagent container 90. That is, a reagent container 90, which is sealed and covered with a sealing cap 95 at a mouth portion 91, is offered for sale or the like. The reagent container 90, which has been unsealed by removing the cap 95, is set in the reagent container rack 100 and placed in the specimen analyzer 200. Since the reagent container 90 may fall down during transportation and/or storage, the reagent in the reagent container 90 may be adhered to the cap 95 that seals the reagent container 90 in advance. Therefore, the reagent may be adhered to the part covered with the cap 95. Therefore, the lid 20, which covers the mouth portion 91 covered with the cap 95 while forming the airtight space CS between itself and the mouth portion 91, can further reduce the risk of adhesion of the reagent to the lid 20. Thus, when the reagent container 90 set in the reagent container rack 100 is replaced with another reagent container 90, the risk of reagent contamination via the lid 20 can be effectively inhibited.

Specifically, the mouth portion 91 is a portion including: an opening end surface 91*a* at which an opening of the reagent container 90 is formed; and an engagement portion 91*b* that is engaged with the cap 95 attached to a sealed reagent container 90 in advance. The lid 20 covers the mouth portion 91 so as to form the airtight space CS between the opening end surface 91*a* of the mouth portion 91 and the engagement portion 91*b*. Thus, the lid 20 covers, via the airtight space CS, not only the opening end surface 91*a* to which the reagent is likely to adhere via the suction tube 121 when the reagent is sucked, but also the engagement portion 91*b* to which the reagent is likely to adhere via the cap 95 that seals the reagent container 90 in advance. Therefore, the risk of adhesion of the reagent to the lid 20 can be effectively reduced.

The engagement portion 91*b* of the mouth portion 91 may be a screw portion that is engaged with the cap 95. The engagement portion 91*b* forms an outer side surface, of the mouth portion 91, extending from the peripheral edge of the opening end surface 91*a* to the trunk portion 92 side. The engagement portion 91*b* is engaged with a female screw portion of the cap 95.

Figure 2B:
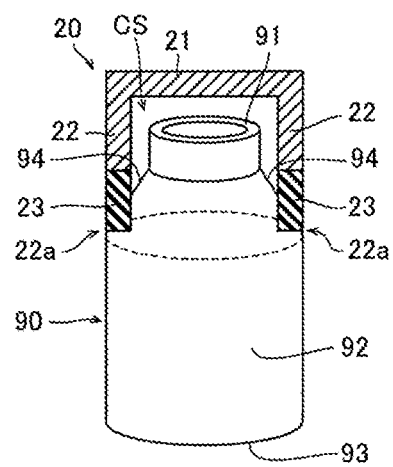
FIG. 2B shows an example of a configuration of a lid.

In the example shown in FIG. 2B, the side wall 22 is formed of an elastic material, and has a contact part 23 that comes into contact with the reagent container 90. The contact part 23 formed of the elastic material is provided at a position, in the side wall 22, which comes into contact with at least the reagent container 90. That is, the contact part 23 is provided at the end portion 22*a*, annularly along the end portion 22*a*. The entirety of the side wall 22 or the entirety of the lid 20 may be formed of the elastic material. When the lid 20 is pressed against the reagent container 90, the contact part 23 is pressed against the reagent container 90 and is elastically deformed. Since the contact part 23 is elastically deformed, the contact part 23 at the end portion 22*a* of the side wall 22 can be adhered to the reagent container 90. Thus, airtightness of the airtight space CS formed inside the lid 20 can be further enhanced, thereby inhibiting evaporation of the reagent more effectively.

Figure 2C:
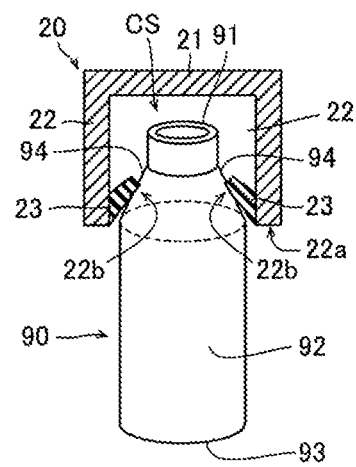
FIG. 2C shows another example of the configuration of the lid.

In the example shown in FIG. 2C, the side wall 22 is formed so as to come into contact, at an inner peripheral surface 22*b* thereof, with at least one of the trunk portion 92 having a greater outer shape than the mouth portion 91 of the reagent container 90, and the intermediate portion 94 connecting the mouth portion 91 to the trunk portion 92. That is, in contrast to the contact at the end portion 22*a* shown in FIG. 2B, the side wall 22 shown in FIG. 2C comes into contact with the outer surface of the reagent container 90 at the inner peripheral surface 22*b* thereof. On the inner peripheral surface 22*b* of the side wall 22, a portion that projects inward and has a decreasing inner diameter is formed. Therefore, the reagent container 90 passes the end portion 22*a* of the side wall 22, and comes into contact with a part of the inner peripheral surface 22*b* of the side wall 22. Thus, even when the outer diameter of the reagent container 90 is small, the airtight space CS can be formed when the inner peripheral surface 22*b* of the side wall 22 comes into contact with the reagent container 90. For example, even when the outer diameter of the reagent container 90 is smaller than the inner diameter of the end portion 22*a* of the side wall 22 as shown in FIG. 2C, the lid 20 can form the airtight space CS by bringing the inner peripheral surface 22*b* of the side wall 22 into contact with the reagent container 90. While the inner peripheral surface 22*b* of the side wall 22 is in contact with the intermediate portion 94 of the reagent container 90 in FIG. 2C, the inner peripheral surface 22*b* of the side wall 22 may be in contact with the outer peripheral surface of the trunk portion 92 of the reagent container 90.

Also in the example shown in FIG. 2C, a contact part 23 formed of an elastic material may be provided. That is, in FIG. 2C, the side wall 22 has the contact part 23 that is formed of the elastic material and comes into contact with the reagent container 90. The contact part 23 is provided so as to project toward the center from the inner peripheral surface 22*b* of the side wall 22. When the lid 20 is pressed against the reagent container 90, the contact part 23 is pressed against the reagent container 90 and is elastically deformed. Since the contact part 23 is elastically deformed, the contact part 23 at the inner peripheral surface 22*b* of the side wall 22 can be adhered to the reagent container 90. Thus, the airtightness of the airtight space CS formed inside the lid 20 can be further enhanced, thereby inhibiting evaporation of the reagent more effectively.

In the example shown in FIG. 2C, the contact part 23 projects such that the inner diameter thereof gradually decreases from the end portion 22*a* of the side wall 22 toward the top plate 21 side. That is, the contact part 23 forms the inclined inner peripheral surface 22*b* of the side wall 22. Therefore, regarding various types of reagent containers 90 having different outer diameters, the lid 20 can form the airtight space CS by bringing the inclined surface of the contact part 23 into contact with each reagent container 90. Thus, it is possible to easily ensure a range of sizes of reagent containers 90 for which the lid 20 can be used.

The contact part 23 formed of the elastic material is more likely to be elastically deformed than other parts of the side wall 22, for example. Preferably, the contact part 23 is formed of a sealing member that comes into contact with the reagent container 90 and hermetically seals the airtight space CS. The sealing member is formed of an elastic material, which is flexible and has less permeability to gas, such as natural rubber or a synthetic rubber such as silicone rubber or fluororubber. Therefore, the contact part 23 has elasticity enough for adhesion to the reagent container 90, and sealing performance enough for intended use. The sealing member adhered to the reagent container 90 allows the space between the lid 20 and the reagent container 90 to be hermetically sealed more reliably.

[Outline of Specimen Analyzer]

Figure 3:
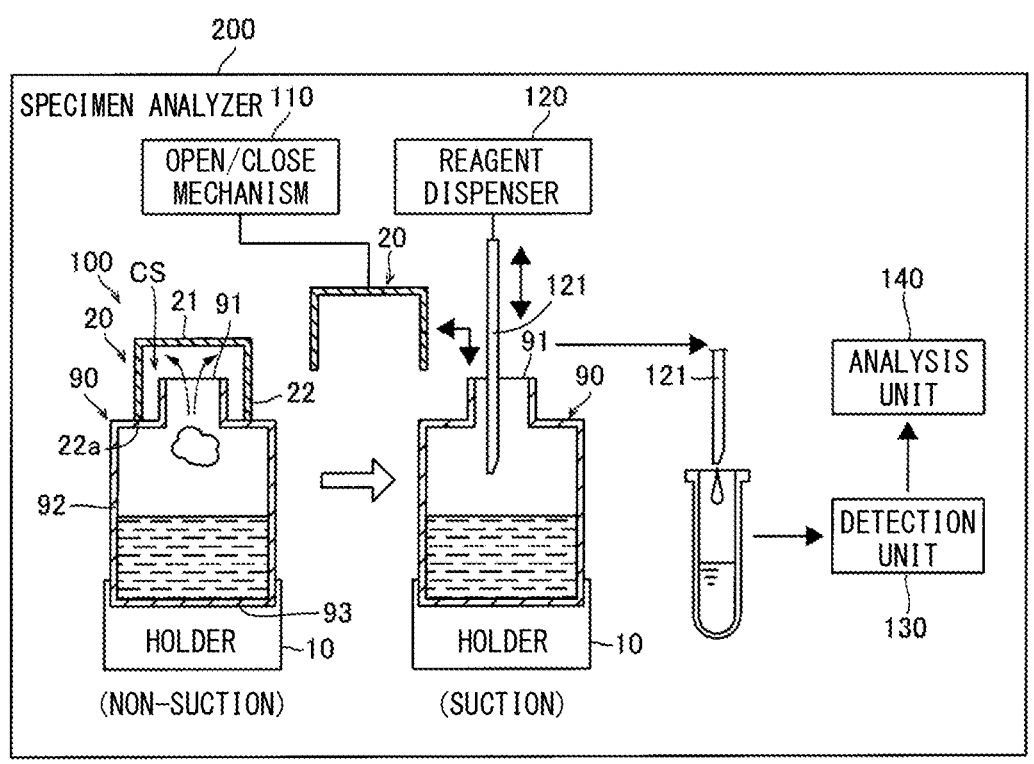
FIG. 3 is a diagram showing the outline of a specimen analyzer.

Next, with reference to FIG. 3, the outline of a specimen analyzer 200 according to one embodiment will be described.

The specimen analyzer 200 is a device that detects a signal based on a component in a specimen by use of a reagent, and analyzes the specimen.

The specimen may be a substance, derived from an organism, which is collected from a subject. The specimen includes a detection target component. A measurement sample for the detection target component is prepared by causing the specimen to react with a reagent added to the specimen. The subject is mostly a human subject, but may be animals other than a human. The specimen analyzer 200 performs analysis for a clinical laboratory test or medical research on a specimen collected from a patient, for example. The specimen derived from an organism is, for example, liquid such as blood (whole blood, serum, or plasma), urine, or other body fluids collected from the subject, or liquid obtained by subjecting the collected body fluid or blood to a predetermined pretreatment. The specimen is not limited to liquid, and may be, for example, a cell or a part of tissue of the subject. The specimen analyzer 200 detects the detection target component contained in the specimen. The detection target component may include, for example, a predetermined component, a cell, or a solid component in the blood or urine specimen. The detection target component may be nucleic acid such as DNA (deoxyribonucleic acid), a cell and an intracellular substance, an antigen or antibody, a protein, a peptide, or the like.

The specimen analyzer 200 includes reagent container racks 100 as described above, an open/close mechanism 110, a reagent dispenser 120, a detection unit 130, and an analysis unit 140.

In the specimen analyzer 200, a reagent container rack 100 in which a reagent container 90 is set is placed. In advance of specimen analysis, for example, a user sets the reagent container 90 in the reagent container rack 100, and places the reagent container rack 100 at a predetermined position in the specimen analyzer 200, with the mouth portion 91 of the reagent container 90 being covered with the lid 20 of the reagent container rack 100.

The open/close mechanism 110 opens and closes the lid 20 of the reagent container rack 100. The open/close mechanism 110 moves a part or the entirety of the lid 20. By moving the lid 20, the open/close mechanism 110 can switch the lid 20 between a state where the airtight space CS is formed by the lid 20 and a state where at least the reagent dispenser 120 is able to access the mouth portion 91 and perform suction of the reagent from the reagent container 90. Only when the reagent dispenser 120 performs suction, the open/close mechanism 110 can set the lid 20 in the state where suction of the reagent is allowed.

The open/close mechanism 110, for example, comes into contact with the lid 20 and applies an external force to the lid 20 to move a part or the entirety of the lid 20. The open/close mechanism 110 can be implemented as, for example, a pressing device that presses a predetermined part of the lid 20 to move the lid 20, a gripper device that grips a predetermined part of the lid 20 to move the lid 20, or a device that attracts the lid 20 through magnetic force, pressure, or the like. When an openable/closable insertion port is provided to a part of the lid 20 as described later, the open/close mechanism 110 may open/close the lid 20 by moving only the part of the lid 20 corresponding to the insertion port. In this case, with the mouth portion 91 of the reagent container 90 being covered with the lid 20, the airtight space CS is opened when the insertion port is opened, and the airtight space CS is formed when the insertion port is closed.

The reagent dispenser 120 dispenses the reagent in the reagent container 90 set in the reagent container rack 100. That is, the reagent dispenser 120 sucks the reagent from the reagent container 90 set in the reagent container rack 100, and discharges the sucked reagent to a predetermined position outside the reagent container 90. The reagent dispenser 120 dispenses the reagent to, for example, a reaction chamber containing a specimen or a reaction chamber in which a specimen will be contained. The dispensed reagent is mixed with the specimen. Thus, a measurement sample containing the specimen and the reagent is prepared.

The reagent dispenser 120 includes, for example, a suction tube 121 for sucking and discharging the reagent. The suction tube 121 is, for example, a straight tube having opposed ends being opened. One end of the suction tube 121 is connected to a pressure source (not shown) such as a pump for supplying negative pressure for suction and positive pressure for discharge. The suction tube 121 can suck liquid from the other end. The reagent dispenser 120 may include a movement mechanism (not shown) for moving the suction tube 121 between the inside and the outside of the reagent container 90. The reagent container rack 100 may be moved by the movement mechanism while the suction tube 121 is fixed, or both the suction tube 121 and the reagent container rack 100 may be moved.

The detection unit 130 detects a signal based on the measurement sample containing the specimen and the reagent. The detection unit 130 detects, for example, a change, in the measurement sample, caused by reaction between the component in the specimen and the reagent. As for a signal detection method, the detection unit 130 may adopt any method according to the target component, such as a chemical method, an optical method, or an electromagnetic method. For example, the detection unit 130 may include an image capturing unit with an image sensor, or a photodetector such as a photomultiplier tube, a phototube, or a photodiode. The detection unit 130 may include a light source. When detecting radiation, the detection unit 130 may include, for example, a radiation detector such as a scintillation counter.

The analysis unit 140 analyzes the specimen, based on the signal detected by the detection unit 130. Based on the detection result of the detection unit 130, the analysis unit 140 analyzes, for example, presence/absence of the detection target component in the specimen, the number or quantity of the detection target component, and the concentration or abundance of the detection target component. The analysis unit 140 performs, for example, quantitative analysis for the detection target component, based on standard information such as a calibration curve or a detection result of a reference specimen and on a measurement result obtained by the detection unit 130.

The analysis unit 140 may be implemented as a computer including a processor such as a CPU (Central Processing Unit), and a storage unit such as a ROM (Read Only Memory), a RAM (Random Access Memory), or a hard disk. When the processor executes a program stored in the storage unit, the computer is caused to function as the analysis unit 140 of the specimen analyzer 200.

In the specimen analyzer 200, after the open/close mechanism 110 has moved the lid 20 of the reagent container rack 100 to enable suction of the reagent from the reagent container 90, the reagent in the reagent container 90 is sucked by the reagent dispenser 120 through the opened mouth portion 91. After the suction of the reagent from the reagent container 90, the lid 20 is moved by the open/close mechanism 110 and forms the airtight space CS. The reagent dispenser 120 discharges the sucked reagent so that the reagent is mixed with the specimen. The specimen analyzer 200 prepares a measurement sample containing the specimen and the reagent. The detection unit 130 detects a signal according to a measurement item from the prepared measurement sample. The analysis unit 140 performs analysis based on the signal detected by the detection unit 130.

As described above, in the present embodiment, the specimen analyzer 200 is provided with the reagent container rack 100 having the lid 20 that covers the mouth portion 91 of the reagent container 90. Therefore, even in the state where an unsealed reagent container 90 is placed in the specimen analyzer 200, evaporation of the reagent can be effectively inhibited. In addition, even when the reagent container 90 covered with the lid 20 is replaced with another reagent container 90, the risk of reagent contamination can be inhibited.

(Configuration of Specimen Analyzer)

An example of a more specific configuration of the specimen analyzer 200 will be described. The specimen analyzer 200 is, for example, an automatic analyzer for blood coagulation analysis (so-called blood coagulation analyzer).

(Blood Coagulation Analysis)

In the specimen analyzer 200 for performing blood coagulation analysis, the detection unit 130 includes a light receiver and a light transmitter. A measurement sample prepared by adding a reagent to a specimen is irradiated with light from the light transmitter, and transmitted light or scattered light, of the light with which the measurement sample is irradiated, is detected by the light receiver. The specimen is plasma or serum separated from blood. The specimen analyzer 200 analyzes the specimen by using a coagulation method, a synthetic substrate method, immunonephelometry, or an aggregation method. The analysis unit 140 analyzes the specimen based on the detected light.

In the coagulation method, the measurement sample is irradiated with light, and a coagulation time in which fibrinogen in the specimen is converted into fibrin is measured based on an electric signal of transmitted light or scattered light from the sample. Measurement items for the coagulation method include PT (prothrombin time), APTT (activated partial thromboplastin time), Fbg (amount of fibrinogen), and the like.

In the synthetic substrate method, the measurement sample is irradiated with light, and the degree of color development caused by an action of a chromogenic synthetic substrate on an enzyme in the measurement sample is measured based on an electric signal of transmitted light from the sample Measurement items for the synthetic substrate method include ATIII (antithrombin III), α2-PI (α2-plasmin inhibitor), PLG (plasminogen), and the like.

In immunonephelometry, a reagent that causes an antigen-antibody reaction on a coagulation/fibrinolysis factor or the like in the specimen is added to the specimen, and the antigen-antibody reaction results in aggregation of a substance contained in the reagent. In immunonephelometry, the measurement sample is irradiated with light, and the aggregation speed, in the measurement sample, of the substance contained in the reagent is measured based on an electric signal of transmitted light or scattered light from the sample. Measurement items for immunonephelometry include D-dimer, FDP (fibrin decomposition product), and the like.

In the aggregation method, the measurement sample is irradiated with light, and a change in absorbance during aggregation reaction of platelets or the like in the measurement sample is measured based on an electric signal of transmitted light from the sample. Measurement items for the aggregation method include vWF:RCo (von Willebrand's ristocetin cofactor), platelet aggregation ability, and the like.

(Immunoassay)

The specimen analyzer 200 may be, for example, an automatic analyzer for immunoassay (so-called immunoassay device). The specimen analyzer 200 detects a target component by using antigen-antibody reaction between the target component in blood and a component in the reagent. The target component to be detected is, for example, an antigen or an antibody, a protein, a peptide, or the like that is contained in blood. The immunoassay device obtains serum or plasma as a specimen, and quantitatively or qualitatively measures an antigen, an antibody, or the like contained in the specimen. The antigen-antibody reaction includes not only reaction between an antigen and an antibody, but also reaction using a specifically binding substance such as an aptamer. The aptamer is a nucleic acid molecule or a peptide synthesized so as to specifically bind to a specific substance.

The specimen analyzer 200 measures light generated from the sample, that is, chemiluminescence based on a test substance contained in the specimen. The specimen analyzer 200 generates measurement data based on the light detected by the detection unit 130.

The chemiluminescence represents light generated by using energy caused by a chemical reaction. The chemiluminescence represents, for example, light emitted when molecules, which have been excited into an excited state by the chemical reaction, are returned from the excited state to a ground state. The chemiluminescence detected by the detection unit 130 is based on chemiluminescence enzyme immunoassay (CLEIA), for example, and is light caused by reaction between an enzyme and a substrate.

Regarding the chemiluminescence enzyme immunoassay, for example, a 2-step method includes: (1) causing a solid-phase carrier to carry a test substance in a specimen in a reaction chamber; (2) performing primary BF separation for separating a solid phase that carries the test substance from a liquid-phase; (3) causing a marker substance to bind to the solid phase that carries the test substance in the reaction chamber; (4) performing secondary BF separation; and (5) adding a chemiluminescent substrate in the reaction chamber to cause enzymatic reaction. Besides the 2-step method, the chemiluminescence enzyme immunoassay includes well-known 1-step method, D-1-step method (delayed 1-step method), and the like. Measurement items for the 2-step method include HBsAg. Measurement items for the 1-step method include HBsAb. Measurement items for the D-1-step method include FT3, FT4, TSH, and the like.

The chemiluminescence detected by the detection unit 130 may be light based on, for example, chemiluminescence immunoassay (CLIA), electric chemiluminescence immunoassay (ECLIA), fluorescence enzyme immunoassay (FEIA), luminescent oxygen channeling immunoassay (LOCI), bioluminescent enzyme immunoassay (BLEIA), or the like.

(Blood Cell Analysis)

The specimen analyzer 200 may be, for example, an automatic analyzer for blood cell counting (so-called blood cell analyzer). The specimen analyzer 200 causes a measurement sample prepared by mixing a blood specimen with a reagent to flow in a flow path, and detects and counts blood cell components flowing in the flow path. The detection unit 130 in a unit for blood cell analysis performs detection by flow cytometry, for example. That is, the detection unit 130 includes a flow path part through which the sample flows; a light transmitter that irradiates the sample flowing in the flow path part with light; and a light receiver that detects the light with which the sample is irradiated.

The detection unit 130 causes particles such as cells to flow in the flow of a sheath liquid formed in the flow path part, the flowing particles are irradiated with laser light from the light transmitter, and scattered light and fluorescence are detected by the light receiver. The specimen analyzer 200 analyzes individual particles based on the light detected by the detection unit 130. For example, a scattergram in which the intensity of scattered light and the intensity of fluorescence are combined as parameters is created, and the sample is analyzed based on scattergram distribution or the like. Measurement items for the flow cytometry include NEUT (neutrophil), LYMPH (lymphocyte), MONO (monocyte), eosinophil (EO), basophil (BASO), and the like.

The specimen analyzer 200 performs detection by a sheath flow DC detection method, for example. That is, the detection unit 130 includes a flow path part having an opening through which the sample flows; and a detection part that detects an electrical change between a pair of electrodes (not shown) opposed to each other with the opening therebetween. The detection unit 130 causes particles such as cells to flow in the flow of the sheath liquid passing through the opening, and applies a DC current across the electrodes. The detection unit 130 detects each particle, based on a pulse-like current change that occurs when the particle passes the opening. Measurement items for the sheath flow DC detection method include WBC (white blood cell) count, RBC (red blood cell) count, HGB (hemoglobin amount), HCT (hematocrit value), MCV (mean corpuscular volume), MCH (mean corpuscular hemoglobin), MCHC (mean cell hemoglobin concentration), PLT (platelet count), and the like.

(Specific Configuration of Specimen Analyzer)

Figure 4:
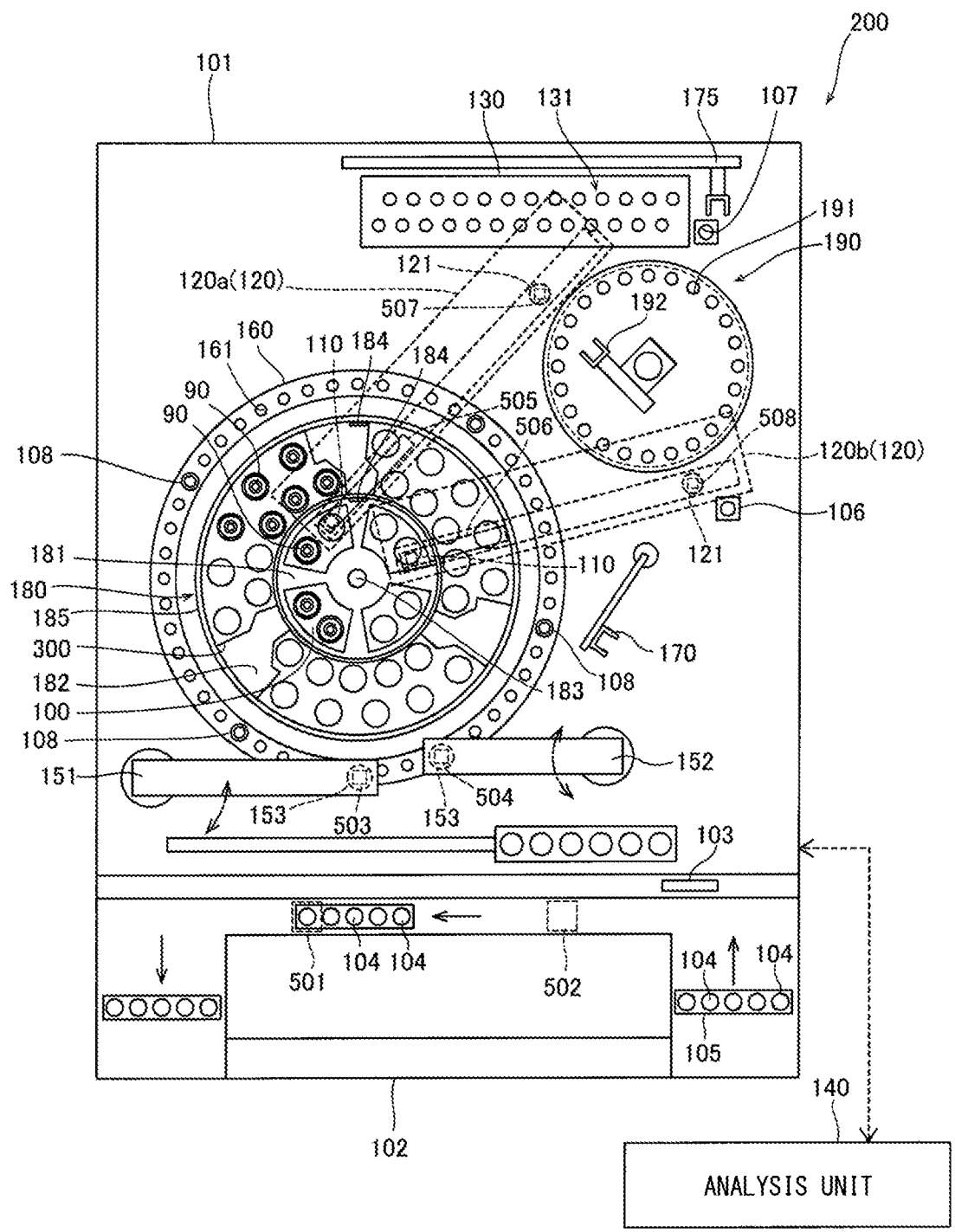
FIG. 4 is a schematic diagram showing an example of a specific configuration of the specimen analyzer.

FIG. 4 shows a specific configuration of the specimen analyzer 200 performing blood coagulation analysis. The specimen analyzer 200 shown in FIG. 4 includes a measurement unit 101, a transporting unit 102, and an analysis unit 140.

The specimen analyzer 200 has a function of sucking a specimen from a specimen container 104 that contains the specimen, and quantitatively dispensing the specimen into a reaction chamber 108.

On the transporting unit 102, a specimen rack 105 is placed. A plurality of specimen containers 104 each containing a specimen can be set in the specimen rack 105. The transporting unit 102 transports the specimen rack 105 placed by the user so as to dispose each specimen container 104 at a predetermined specimen suction position 501 or 502. A label (not shown) in which identification information is recorded in a barcode or the like is attached to each of the specimen rack 105 and the specimen containers 104. The identification information of the specimen rack 105 and the specimen containers 104 is read by a reader 103 provided at some midpoint in a transport route and is transmitted to the analysis unit 140. The identification information allows the specimen in each specimen container 104 and the measurement result of the specimen to be managed in association with each other.

The measurement unit 101 includes specimen dispensers 151 and 152 each for sucking the specimen in a specimen container 104 and quantitatively dispensing the specimen into a reaction chamber 108.

Each of the specimen dispensers 151 and 152 is implemented as a dispensing arm that pivotally holds a pipette 153 for specimen dispensing. The pipette 153 is connected to a pump (not shown), which allows quantitative suction and discharge of the specimen. The specimen dispenser 151 moves the pipette 153 to suck a predetermined amount of the specimen from the specimen container 104 at the specimen suction position 501. The specimen dispenser 152 moves the pipette 153 to suck a predetermined amount of the specimen from the specimen container 104 at the specimen suction position 502. The specimen dispensers 151 and 152 move the corresponding pipettes 153 to discharge the sucked specimen into the reaction chambers 108 disposed at predetermined specimen dispensing positions 503 and 504, respectively.

The measurement unit 101 performs optical measurement on a measurement sample that is prepared by adding a predetermined reagent to a specimen sucked by a specimen dispenser.

The measurement unit 101 includes a mechanism for transferring, to the respective units, a reaction chamber 108 in which a specimen and a reagent are contained to prepare a measurement sample. In the configuration example shown in FIG. 4, the measurement unit 101 includes a rotatable table 160 that transports reaction chambers 108. The rotatable table 160 has a ring shape in a plan view, and is rotatable in the circumferential direction. The rotatable table 160 includes a plurality of holding holes 161 arranged along the circumferential direction. One reaction chamber 108 can be set in each holding hole 161. The specimen dispensers 151 and 152 each can dispense the sucked specimen into a new reaction chamber 108 held on the rotatable table 160. The specimen dispensers 151 and 152 each can suck a specimen from a reaction chamber 108, on the rotatable table 160, which contains the specimen.

The rotatable table 160 rotates in the circumferential direction to transport the reaction chambers 108 placed on the rotatable table 160.

A large number of new reaction chambers 108 are stored in a container storage unit (not shown), and are removed one by one from the container storage unit. The reaction chambers 108 removed from the container storage unit are set in the holding holes 161 of the rotatable table 160.

In the configuration example shown in FIG. 4, the specimen analyzer 200 has a function of preparing a measurement sample by adding a reagent to a specimen in a reaction chamber 108. The measurement sample is a mixture of the specimen and the reagent.

The measurement unit 101 includes a gripping mechanism 170 capable of transporting a reaction chamber 108. The gripping mechanism 170 can grip and transfer a reaction chamber 108, set the reaction chamber 108 in a holding hole 161, and remove the reaction chamber 108 from the holding hole 161. In addition, the gripping mechanism 170 can transfer the held reaction chamber 108 to a disposal port 106.

The measurement unit 101 includes a reagent table 180 that accommodates reagent containers 90 used for measurement; and reagent dispensers 120 for sucking and discharging reagents from reagent containers 90 set on the reagent table 180. In the example shown in FIG. 4, a plurality of (two) reagent dispensers 120, i.e., a reagent dispenser 120a and a reagent dispenser 120b, are provided.

The reagent table 180 is disposed inside the rotatable table 160, and has a circular shape in a plan view. On the reagent table 180, a reagent container rack in which a reagent container 90 is set can be placed. A plurality of reagent container racks can be placed on the reagent table 180. The reagent contained in the reagent container 90 is a reagent for blood coagulation analysis.

Specifically, the reagent table 180 includes a first table 181 disposed in a center portion and having a circular shape in a plan view; and a second table 182 disposed at the outer periphery of the first table 181 and having an annular shape in a plan view.

In the example shown in FIG. 4, on the first table 181, four reagent container racks 100 can be arranged adjacent to each other in the circumferential direction. On the second table 182, three large-size reagent container racks 300 can be arranged adjacent to each other along the circumferential direction. Not all the reagent container racks are provided with lids 20. A reagent container rack 100 having a lid 20 can be used as, for example, a dedicated rack for a reagent container 90 containing a specific reagent whose evaporation is desired to be inhibited.

As described above, on the reagent table 180, the reagent container racks 100 and 300, each holding a plurality of reagent containers 90, can be arranged along the circumferential direction. The reagent table 180 is rotatable in the circumferential direction. The rotation of the reagent table 180 allows any reagent container 90 to be disposed at a predetermined reagent suction position. The first table 181 and the second table 182 are independently rotatable in the circumferential direction around a central rotary shaft 183 by a rotation mechanism (not shown) having an electric motor. The rotation of the first table 181 allows each of the reagent containers 90 placed on the first table 181 to be moved to the reagent suction position 505, 506. The rotation of the second table 182 allows each of the reagent containers 90 placed on the second table 182 to be moved to reagent suction position 505, 506.

An open/close mechanism 110 is provided at each of the reagent suction positions 505 and 506. The open/close mechanism 110 opens/closes the lid 20 when the reagent container rack, which holds the reagent container 90 placed at the reagent suction position, is a reagent container rack 100 having a lid 20.

The reagent table 180 includes reagent reading units 184 that read identification information assigned to the individual reagent containers 90 and the individual reagent container racks 100 (300). Identification information of a reagent may include, for example, information of the name, type, lot number, and expiration date of the reagent. Information of a reagent container rack 100 (300) may include, for example, information of unique identification number (ID) for identifying the reagent container rack. Each of the first table 181 and the second table 182 can move the reagent containers 90 and the reagent container racks 100 (300) placed thereon to a reading position opposing the corresponding reagent reading unit 184. The reagent identification information and the reagent container rack identification information allow recognition as to which reagent is placed at which position on the reagent table 180. The reagent container rack identification information allows recognition as to which reagent container rack is a reagent container rack 100 having a lid 20.

FIG. 4 shows the internal space of the reagent table 180 while omitting the upper surface of the reagent table 180. However, the reagent table 180 includes a casing 185 having a hollow box-like structure with a bottom surface portion, a side surface, and an upper surface portion. The casing 185 contains the first table 181 and the second table 182 therein. The casing 185 is formed of a material having heat insulating property, and has a heat retaining function. The reagent table 180 has, for example, a temperature adjusting unit (not shown) such as a Peltier device. The reagent table 180 is configured as a reagent cooling box that keeps a reagent container 90 held by a reagent container rack 100 placed therein at a predetermined storage temperature.

Each reagent dispenser 120 is provided with a suction tube 121 for dispensing a reagent. The suction tube 121 is connected to a pump (not shown), and is able to perform quantitative suction and discharge of the reagent. The reagent dispenser 120*a* is able to suck a predetermined amount of a reagent from a reagent container 90 disposed at a predetermined reagent suction position 505 on the reagent table 180. The reagent dispenser 120*a* is able to move the suction tube 121 to a reagent dispensing position 507 and discharge a predetermined amount of the reagent into a reaction chamber 108 at the reagent dispensing position 507.

The reagent dispenser 120*b* is able to suck a predetermined amount of a reagent from a reagent container 90 disposed at a predetermined reagent suction position 506 on the reagent table 180. The reagent dispenser 120*b* is able to move the suction tube 121 to a reagent dispensing position 508 and discharge a predetermined amount of the reagent into a reaction chamber 108 at the reagent dispensing position 508.

The measurement unit 101 is provided with a rotatable table 190 for holding and humidifying a reaction chamber 108 containing a specimen dispensed thereto. The rotatable table 190 includes a plurality of holding holes 191 for holding a plurality of reaction chambers 108 each containing a specimen; and a gripping mechanism 192 for gripping and transferring a reaction chamber 108. The rotatable table 190 has, embedded therein, a heater (not shown) for heating the reaction chambers 108 held in the plurality of holding holes 191.

The rotatable table 190 has a circular shape in a plan view, and has the plurality of holding holes 191 arranged along the circumferential direction. The rotatable table 190 is rotatable in the circumferential direction. The rotatable table 190 is able to transfer, through rotation, the reaction chambers 108 set in the plurality of holding holes 191 in the circumferential direction while heating the reaction chambers 108 at a predetermined temperature. The gripping mechanism 192 grips and transfers a reaction chamber 108 to set the reaction chamber 108 in a holding hole 191 or remove a reaction chamber 108 from a holding hole 191.

The measurement unit 101 is provided with a detection unit 130 for detecting a signal based on a measurement sample in a reaction chamber 108. The detection unit 130 includes chamber setting portions 131 in which reaction chambers 108 each containing a specimen are to be set; a light receiver 132 (refer to FIG. 5) provided so as to correspond to the chamber setting portions 131; and a light transmitter 133 (refer to FIG. 5) for irradiating reaction chambers 108 set in chamber setting portions 131 with light for signal detection.

In the configuration example shown in FIG. 4, the detection unit 130 includes a plurality of chamber setting portions 131. In the detection unit 130, the plurality of chamber setting portions 131 are linearly arranged in two rows at predetermined intervals.

The measurement unit 101 includes a gripping mechanism 175 for transferring a reaction chamber 108 to the detection unit 130.

The gripping mechanism 175 includes a movement mechanism (not shown) movable in X, Y, and Z directions that are three-axis directions orthogonal to each other. The gripping mechanism 175 is able to grip and transfer a reaction chamber 108. The gripping mechanism 175 is able to remove a reaction chamber 108 from a holding hole 191 of the rotatable table 190, transfer the reaction chamber 108 to the reagent dispensing position 507, and set the reaction chamber 108, into which a reagent has been dispensed, in a chamber setting portion 131 of the detection unit 130. In addition, the gripping mechanism 175 is able to remove a reaction chamber 108 having been subjected to measurement from the chamber setting portion 131, and transfer the reaction chamber 108 to the disposal port 107.

In the detection unit 130, detection of an optical signal based on a measurement sample in a reaction chamber 108 set in a chamber setting portion 131 is performed. The light transmitter 133 (refer to FIG. 5) irradiates the reaction chamber 108 set in the chamber setting portion 131 of the detection unit 130 with light for signal detection. The light transmitter 133 includes a light source such as a light emitting diode and a halogen lamp. The light transmitter 133 may include a light guide such as an optical fiber for transmitting the light from the light source to each of the chamber setting portions 131. The light receiver 132 (refer to FIG. 5) receives transmitted light or scattered light of the light with which the reaction chamber 108 is irradiated, and outputs an electric signal according to the amount of the received light. The light receiver 132 includes a photoelectric conversion element that converts the received light into an electric signal, and outputs the electric signal. The electric signal is transmitted to the analysis unit 140. Based on the electric signal outputted from the light receiver 132, the analysis unit 140 analyzes the specimen.

(Configuration of Specimen Analyzer Regarding Control)

Figure 5:
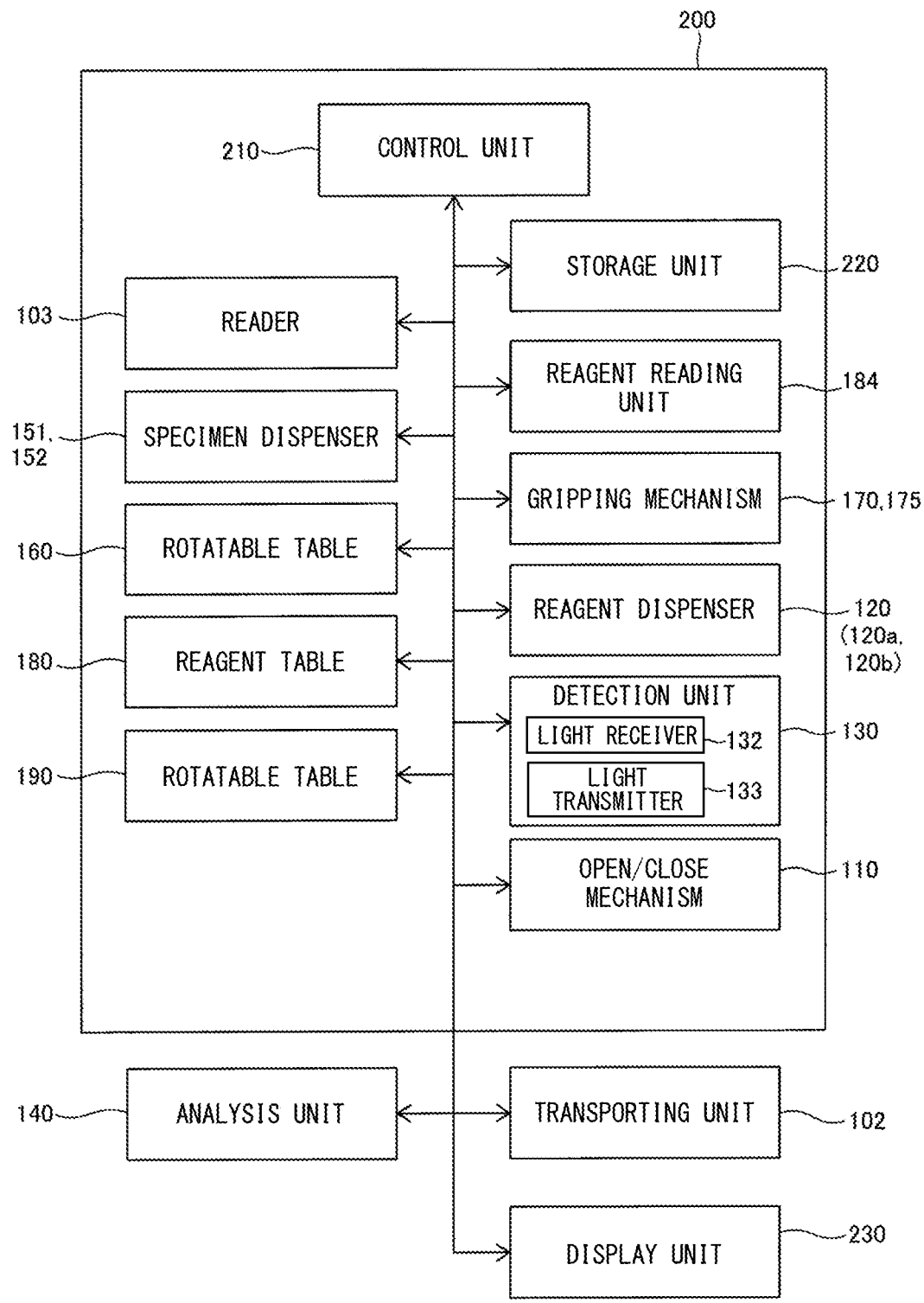
FIG. 5 is a block diagram showing a configuration of the specimen analyzer regarding control thereof.

Next, the configuration of the specimen analyzer 200 regarding control will be described with reference to FIG. 5.

The specimen analyzer 200 includes a control unit 210 and a storage unit 220. The control unit 210 includes a processor such as a CPU or an FPGA (Field-Programmable Gate Array). The storage unit 220 includes volatile and/or nonvolatile storage devices such as a ROM, a RAM, and a hard disk. The processor functions as a control unit of the specimen analyzer 200 by executing a control program stored in a storage unit. The control unit 210 controls the operations of the aforementioned respective units in the specimen analyzer 200. The control unit 210 controls the dispensing operation of the reagent dispenser 120, the dispensing operations of the specimen dispensers 151 and 152, the operation of the reagent table 180, the operations of the respective rotatable tables and gripping mechanisms, the operation of the open/close mechanism 110, and reception and transmission of light by the light receiver 132 and the light transmitter 133 of the detection unit 130.

The analysis unit 140 is implemented as a personal computer. The analysis unit 140 is configured to include, for example, a processor such as a CPU and a storage device such as a ROM, a RAM, or a hard disk. The processor functions as the analysis unit 140 of the specimen analyzer 200 by executing a control program stored in a storage unit. The specimen analyzer 200 includes a display unit 230 that displays an analysis result.

The analysis unit 140 is electrically connected to the control unit 210 of the specimen analyzer 200, and controls the specimen analyzer 200. The analysis unit 140 analyzes the specimen on the basis of a signal detected by the detection unit 130 of the specimen analyzer 200. The analysis unit 140 is connected to a host computer (not shown) via a network, and obtains, from the host computer, a measurement order for the specimen analyzer 200. The analysis unit 140 controls the specimen analyzer 200 so as to execute measurement according to the obtained measurement order.

(Specific Configuration Example of Reagent Container Rack)

Next, a specific configuration example of a reagent container rack 100 set on the reagent table 180 of the specimen analyzer 200 shown in FIG. 4 will be described.

A reagent container rack 100 shown in FIG. 6 to FIG. 10 includes a plurality of holders 10. In the example shown in FIG. 6 to FIG. 10, the reagent container rack 100 is provided with two holders 10 (refer to FIG. 7 and FIG. 9). In the reagent container rack 100, two reagent containers 90 can be set in the respective holders 10 in a one-to-one manner. Thus, for example, when a plurality of reagents are used for one measurement item, reagent containers 90 to be used can be collectively set in the same reagent container rack 100, thereby enhancing convenience of the user.

A lid 20 is provided so as to cover a mouth portion 91 of a reagent container 90 held by at least one of the plurality of holders 10. In the case where the reagent container rack 100 includes a plurality of holders 10 to hold a plurality of reagent containers 90, the lid 20 need not be provided for all the reagent containers 90.

That is, there are some reagents that will not affect the analysis results even when the concentrations thereof are changed due to evaporation. Such reagents are not necessarily inhibited from being evaporated by use of the lid 20. Therefore, in the configuration example shown in FIG. 6 to FIG. 10, a lid 20 is provided to a reagent container 90 that needs inhibition of reagent evaporation while no lid 20 is provided to a reagent container 90 that does not need inhibition of reagent evaporation. Therefore, in a holder 10 provided with no lid 20, mounting and replacement of a reagent container 90 can be simplified.

As one example, the reagent container rack 100 holds a reagent container 90 containing a first reagent and a reagent container 90 containing a second reagent, which are used for specimen analysis of the same measurement item.

One example of a measurement item of blood coagulation analysis is ATIII. Reagents for ATIII include an enzyme reagent and a substrate. A reagent container 90 containing an enzyme reagent is set in a holder 10a having a lid 20. A reagent container 90 containing a substrate is set in a holder 10b having no lid 20. In measuring ATIII, when the enzyme reagent is added to the specimen, the enzyme and ATIII in the specimen generate an inactive complex. When the substrate is further added, the substrate is decomposed by residual activity of the enzyme in response to activity of the ATIII to generate a decomposed product. When the concentration of the enzyme reagent increases with evaporation of moisture in the enzyme reagent, the content of enzyme per unit volume of the enzyme reagent increases, and the degree of the residual activity changes according to the concentration of the reagent, which affects the result of detection by the detection unit 130. Meanwhile, regarding the substrate, since an excess amount of the substrate is contained so as to react with the remaining enzyme, the substrate is not affected by a change in concentration due to evaporation of moisture in the reagent. Between the enzyme reagent and the substrate, the reagent container 90 containing the enzyme reagent is covered with the lid 20 when the reagent container 90 is unsealed, thereby inhibiting evaporation of the enzyme reagent.

In the example shown in FIG. 6 to FIG. 10, the reagent container rack 100 includes a holder 10 that supports a bottom portion 93 (refer to FIG. 10) of a reagent container 90; a lid 20 that covers a mouth portion 91 from above the reagent container 90; and a support portion 30 that connects the holder 10 and the lid 20. The support portion 30 is provided so as to extend upward from the holder 10 to the lid 20. The support portion 30 is connected to the lid 20 at an upper end thereof. Thus, it is possible to obtain a single reagent container rack 100 including a holder 10 and a lid 20 which are not individual components separated from each other but are connected to each other via a support portion 30. In this case, it is not necessary to individually manage the respective components, which makes handling of the reagent container rack 100 easy. Thus, convenience of the user can be enhanced.

Figure 8:
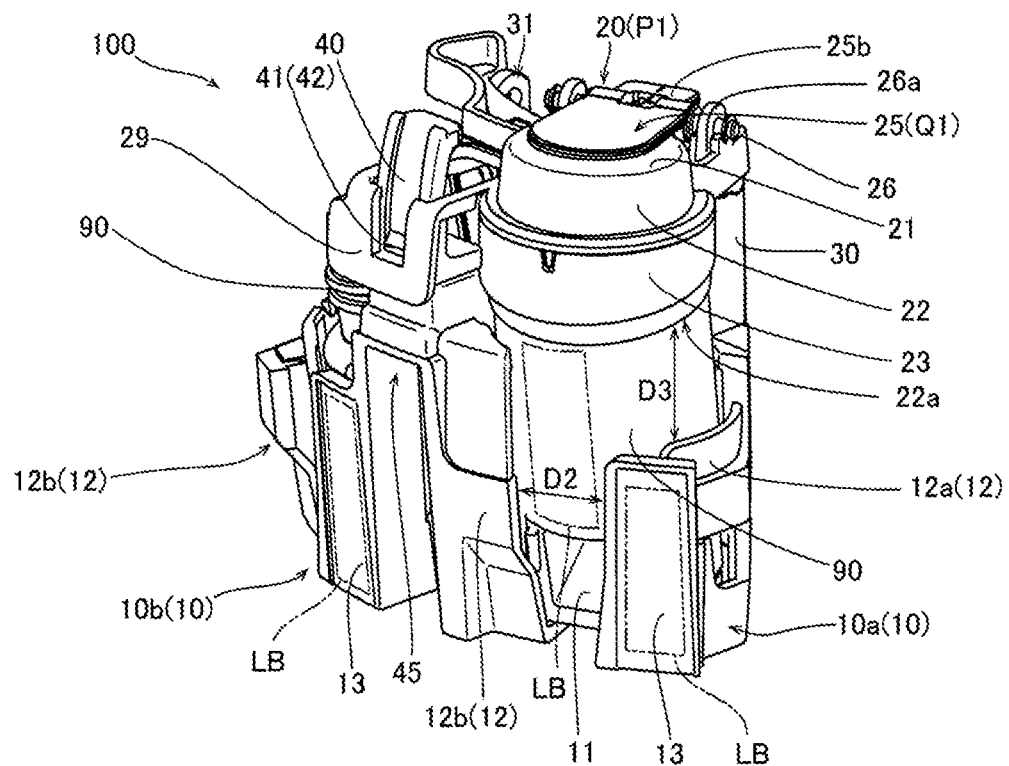
FIG. 8 is a perspective view showing the reagent container rack in a state where a reagent container is set and a lid is closed.
Figure 9:
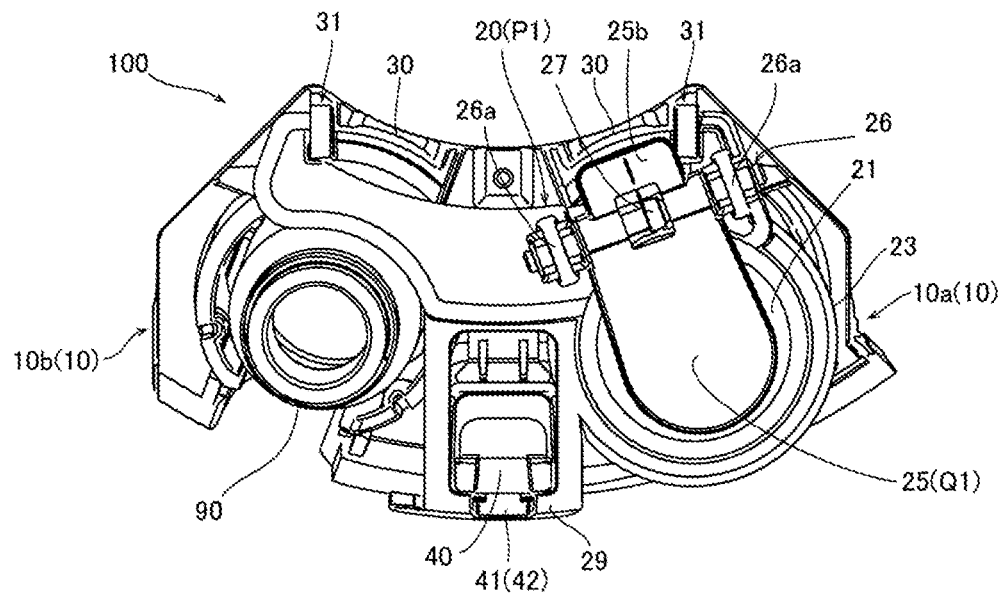
FIG. 9 is a plan view of the reagent container rack.
Figure 10:
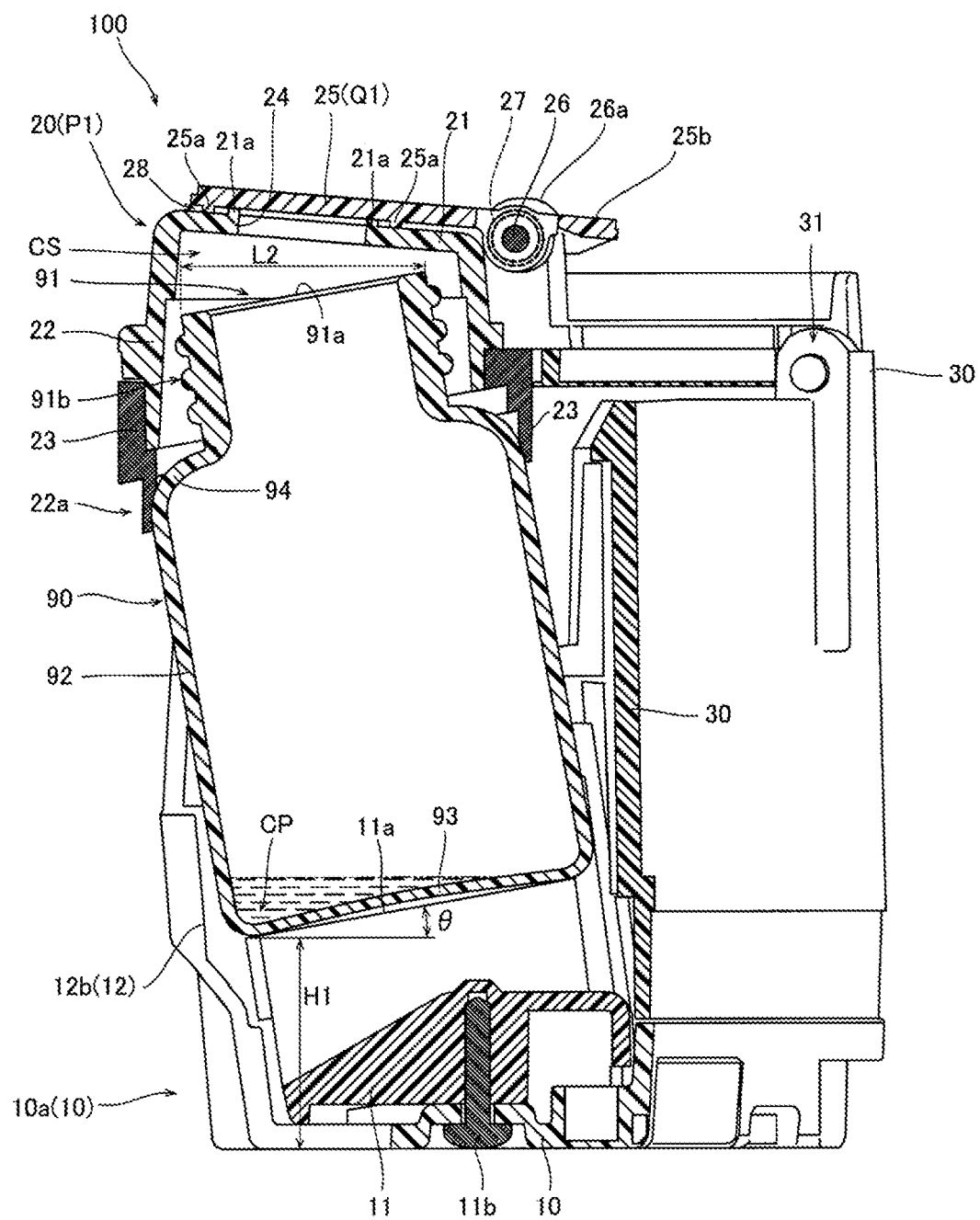
FIG. 10 is an enlarged cross-sectional view showing a vertical cross section, passing the lid, of the reagent container rack.

The support portion 30 supports the lid 20 so that the lid 20 is movable between a closed position P1 (refer to FIG. 8) at which the lid 20 covers the mouth portion 91 of the reagent container 90 and an opened position P2 (refer to FIG. 7) at which the reagent container 90 can be mounted to and removed from the holder 10. At the closed position P1, as shown in FIG. 8 and FIG. 10, the lid 20 is disposed so as to cover the upper part of the reagent container 90 including the mouth portion 91 such that an airtight space CS (refer to FIG. 10) is formed between the lid 20 and the mouth portion 91. At the opened position P2, the lid 20 is disposed at a position deviating from the upper part of the reagent container 90. Since the upper side of the reagent container 90 is opened, mounting and removal of the reagent container 90 to/from the holder 10 can be smoothly performed. Thus, even when the holder 10 and the lid 20 are connected to each other via the support portion 30, mounting of the reagent container 90 to the holder 10 and replacement of the reagent container 90 can be easily performed by moving the lid 20, thereby enhancing convenience of the user.

The support portion 30 is connected to the lid 20 via a first hinge 31 (refer to FIG. 7) that pivots the lid 20 between the closed position P1 and the opened position P2. The first hinge 31 has a rotary shaft in the horizontal direction, and pivotally supports the lid 20 in the up-down direction. Therefore, when the lid 20 moves from the opened position P2 to the closed position P1, the lid 20 pivots around the first hinge 31 and moves downward from above the reagent container 90 set in the holder 10, and covers the reagent container 90. At the closed position P1, the lid 20 comes into contact with the reagent container 90 by its own weight as well as by being pressed from above toward the reagent container 90.

<Lid>

As shown in FIG. 10, the lid 20 has a top plate 21, and a tubular side wall 22 that extends from the top plate 21 toward the holder 10 side. The top plate 21 is formed in a flat circular shape having a diameter greater than the outer diameter of the mouth portion 91 of the reagent container 90. The side wall 22 has a substantially cylindrical shape extending downward from the peripheral edge of the top plate 21 toward the holder 10.

At the end portion 22a of the side wall 22 extending downward, a contact part 23, which is formed of an elastic member and comes into contact with the reagent container 90, is provided. At the end portion 22a, the contact part 23 is provided annularly along the end portion 22a. In the example shown in FIG. 10, the contact part 23 is a sealing member that is detachably provided to the side wall 22, as a member separated from the side wall 22. When the contact part 23 is pressed against the reagent container 90, the contact part 23 is elastically deformed so as to adhere to the reagent container 90.

The lid 20 is provided so as to cover the mouth portion 91 and form the airtight space CS between the lid 20 and the mouth portion 91 of the reagent container 90. The lid 20 is configured to cover the mouth portion 91 without being in contact with the mouth portion 91.

The lid 20 is configured to cover the mouth portion 91 and form the airtight space CS between the lid 20 and the mouth portion 91 when the side wall 22 thereof comes into contact with the outer surface, of the reagent container 90, except for the mouth portion 91.

Specifically, the inner shape of the side wall 22 is greater than the outer shape of the mouth portion 91. In the state where the airtight space CS is formed, the maximum dimension of the mouth portion 91 in the horizontal direction is a length L2. The inner diameter of the side wall 22 is greater than the length L2. Therefore, the side wall 22 is provided such that the mouth portion 91 of the reagent container 90 is disposed inside the side wall 22 in the horizontal direction, and thus the side wall 22 is apart from the mouth portion 91. The side wall 22 is formed in contact with the outer surface of an intermediate portion 94 of the reagent container 90 at the end portion 22a thereof.

In the example shown in FIG. 10, the intermediate portion 94 of the reagent container 90 has an inclined surface that decreases the outer diameter thereof from the upper end of the trunk portion 92 toward the mouth portion 91. The intermediate portion 94 connects the upper end of the trunk portion 92 to the lower end of the engagement portion 91b of the mouth portion 91. The engagement portion 91b has a screw portion for attachment of the cap 95 (refer to FIG. 2A) of the reagent container 90. The engagement portion 91b is connected to the opening end surface 91a of the mouth portion 91. The contact part 23 provided at the end portion 22a of the side wall 22 is configured to come into contact with the inclined intermediate portion 94.

The inner diameter of the contact part 23 is slightly smaller than the maximum outer diameter of the intermediate portion 94 of the reagent container 90. When the lid 20 forms the airtight space CS, the lid 20 is pressed toward the reagent container 90, whereby the intermediate portion 94 is fitted to the inner side of the contact part 23. The contact part 23 is expanded from the inner side by the inclined surface of the intermediate portion 94, and is deformed to be adhered to the reagent container 90. The amount of deformation of the contact part 23 may be very small as long as the adhesion between the contact part 23 and the intermediate portion 94 can be achieved.

As shown in FIG. 6 to FIG. 9, the reagent container rack 100 has an engagement portion 41 that engages with the lid 20, and holds the lid 20 while the contact part 23 is being pressed against the reagent container 90 held in the holder 10. Since the lid 20 is engaged with the engagement portion 41, the contact part 23 can be kept elastically deformed to be pressed against and adhered to the reagent container 90. Thus, the airtight space CS formed inside the lid 20 can be easily kept hermetically sealed.

Specifically, a loop portion 29, which is integrally formed with the lid 20, is connected to the lid 20. The loop portion 29 has an annular shape. A grip portion 40 on which the engagement portion 41 is formed can be inserted on the inner periphery side of the loop portion 29.

The engagement portion 41 includes a hook 42 (refer to FIG. 7) that engages with the loop portion 29. The engagement portion 41 is provided on the grip portion 40 that rises upward from a connection part 45 that connects the two holders 10. When the lid 20 is pivoted together with the loop portion 29 from the opened position P2 (refer to FIG. 7) to the closed position P1 (refer to FIG. 8), the grip portion 40 is inserted in the loop portion 29, and the hook 42 of the engagement portion 41 is engaged with the inner peripheral surface of the loop portion 29. The engagement of the engagement portion 41 with the loop portion 29 (i.e., the lid 20) restricts movement of the lid 20 toward the opened position P2 side. The engagement portion 41 is formed at a position where the lid 20 is engaged with the engagement portion 41 with the contact part 23 being deformed due to the lid being pressed against the reagent container 90. Therefore, the engagement of the engagement portion 41 with the lid 20 keeps the state where the contact part 23 is adhered to the reagent container 90. In order to move the lid 20 to the opened position P2, the grip portion 40 is pressed and deformed, whereby the hook 42 of the engagement portion 41 moves and the engagement of the hook 42 with the loop portion 29 is canceled.

As shown in FIG. 10, the lid 20 has: an insertion port 24 through which a suction tube 121 for sucking a reagent is inserted; and an openable/closable cover portion 25 that closes the insertion port 24.

The insertion port 24 is formed so as to penetrate the top plate 21 of the lid 20 in the up-down direction. The insertion port 24 is formed so as to be disposed immediately above the mouth portion 91 of the reagent container 90 while the lid 20 forms the airtight space CS. Thus, suction of the reagent using the suction tube 121 can be performed with the cover portion 25 being opened while the lid 20 is located at the closed position P1 and covers the mouth portion 91. Therefore, as compared to the configuration in which the whole lid 20 is moved to the opened position P2 when suction of a reagent is performed, the inside of the reagent container 90 is inhibited from being opened to the outside, thereby inhibiting evaporation of the reagent.

The cover portion 25 has an outer shape greater than the insertion port 24 so as to cover the entirety of the insertion port 24. The cover portion 25 has a flat shape. The cover portion 25 is superposed on the upper surface of the top plate 21 in which the insertion port 24 is formed, thereby covering and closing the insertion port 24. In the example shown in FIG. 10, the cover portion 25 is rotatably connected to the lid 20 via a second hinge 26 so as to be able to open and close the insertion port 24.

Like the first hinge 31, the second hinge 26 has a rotary shaft in the horizontal direction, and rotatably supports the cover portion 25 in the up-down direction. The second hinge 26 is attached to a shaft bearing 26a provided to the lid 20. The second hinge 26 supports the cover portion 25 so that the cover portion 25 is pivotable between a closed position Q1 (refer to FIG. 11) at which the cover portion 25 is superposed on the upper surface of the top plate 21 to close the insertion port 24 and an opened position Q2 (refer to FIG. 12) at which the cover portion 25 rises upward with respect to the upper surface of the top plate 21 to open the insertion port 24. Thus, the insertion port 24 can be easily opened and closed by only pivoting the cover portion 25.

In the example shown in FIG. 10, the reagent container rack 100 includes an urging member 27 that urges the cover portion 25 toward the insertion port 24. The urging member 27 urges the cover portion 25 in a direction from the opened position Q2 toward the closed position Q1. With the urging force of the urging member 27, the cover portion 25 is pressed toward the upper surface of the top plate 21 and comes into contact with the top plate 21. Thus, the urging force of the urging member 27 can enhance airtightness with the cover portion 25 being closed. The urging member 27 is, for example, a torsion spring provided to the second hinge 26.

In the example shown in FIG. 10, the cover portion 25 forms a sealing portion 28 between itself and the top plate 21 with the insertion port 24 being closed. Specifically, an annular rib 21a, which projects upward from the peripheral edge of the insertion port 24, is formed on the upper surface of the top plate 21. In addition, an annular rib 25a, which projects downward to the top plate 21, is formed on the surface of the cover portion 25 on the top plate 21 side. The inner diameter of the annular rib 25a is greater than the outer diameter of the annular rib 21a. The annular rib 21a and the annular rib 25a are formed concentrically around the insertion port 24. Therefore, when the cover portion 25 is at the closed position Q1, a labyrinth sealing portion 28 is formed by the rib 21a and the rib 25a. Thus, airtightness, in the case where the cover portion 25 is at the closed position Q1, is enhanced.

<Holder>

Figure 6:
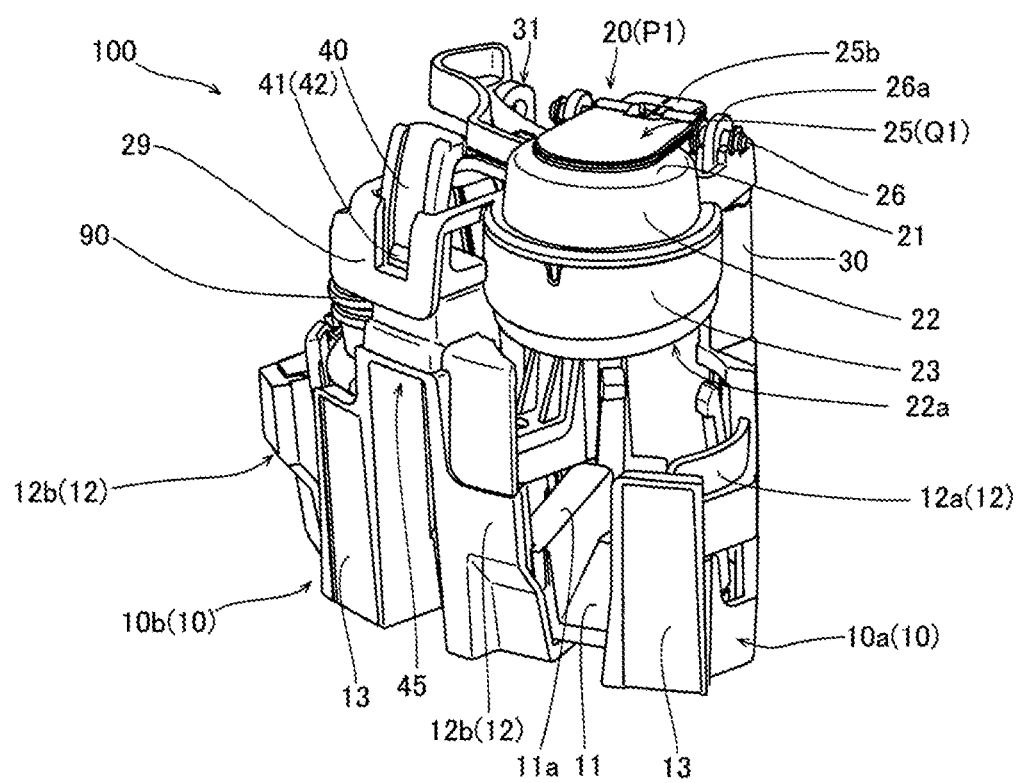
FIG. 6 is a perspective view showing an example of a specific configuration of a reagent container rack.
Figure 7:
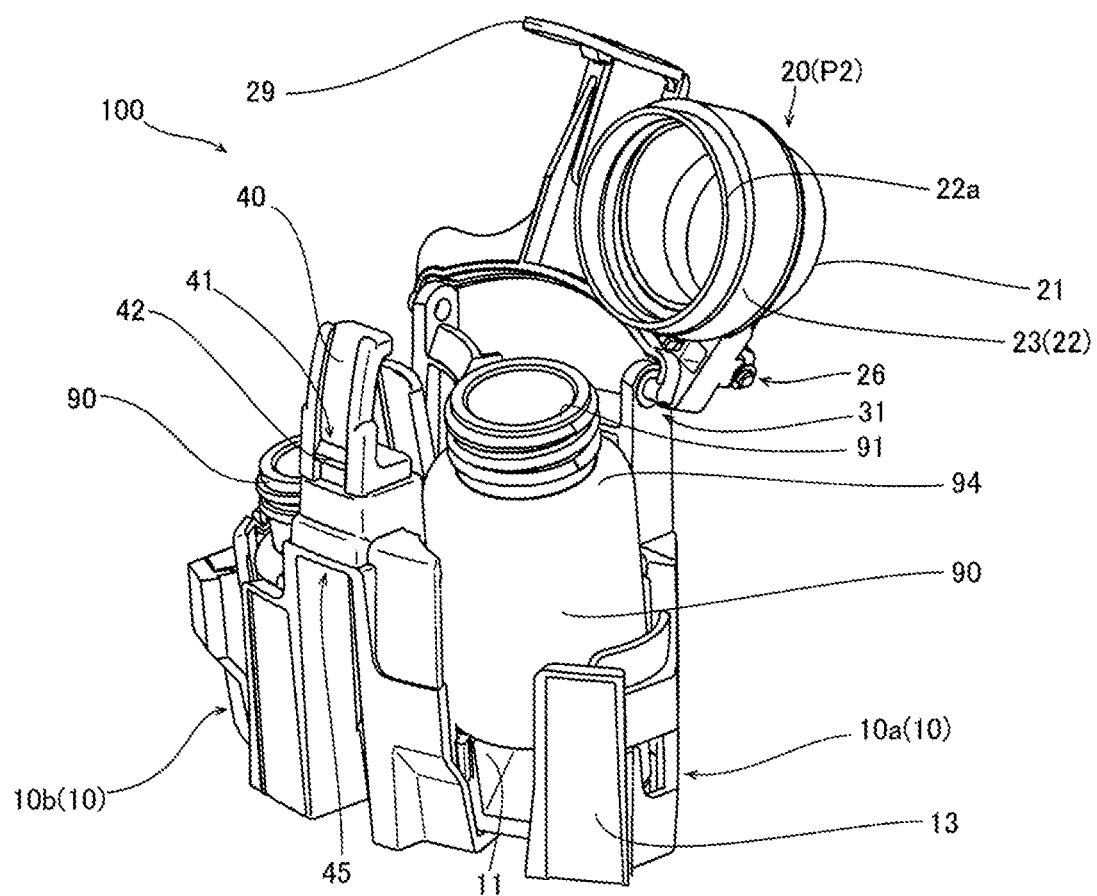
FIG. 7 is a perspective view of the reagent container rack with a lid being located at an opened position.

As shown in FIG. 6, the holder 10 includes a mounting portion 11 that supports the bottom portion 93 of the reagent container 90; and a lateral portion 12 opposing the outer peripheral surface of the reagent container 90. The lateral portion 12 is provided along the outer peripheral surface of a lower part of the trunk portion 92 of the reagent container 90. Thus, the mounting portion 11 stably supports the reagent container 90, and the lateral portion 12 inhibits the reagent container 90 from being shifted in the horizontal direction.

The mounting portion 11 of the holder 10 has an inclined mounting surface 11a on which the reagent container 90 is to be mounted. The mounting surface 11a keeps the reagent container 90 inclined on the holder 10. The inclined mounting surface 11a causes an inner bottom surface of the reagent container 90 to be inclined such that one side thereof in the inclination direction is positioned lower than the other side thereof. The lid 20 (refer to FIG. 10) is configured to form an airtight space CS between itself and the inclined mouth portion 91.

As shown in FIG. 10, the inclined mounting surface 11a causes the reagent container 90 to be inclined, whereby the reagent can be collected in the lowest portion of the reagent container 90. The reagent in the reagent container 90 is collected in a corner portion CP corresponding to the lower side of the inner bottom surface. As a result, even when the remaining amount of the reagent is small, the collected reagent can be sucked, thereby reducing the dead volume of the reagent. Even when the reagent container 90 is inclined as described above, evaporation of the reagent can be inhibited by covering the mouth portion 91 with the lid 20, whereby the reagent can be effectively used as much as possible while inhibiting change in concentration due to evaporation.

The mounting portion 11 is configured as a replacement component that is detachable from the holder 10 and supports the bottom portion 93 of the reagent container 90 at a predetermined height and a predetermined angle. The mounting portion 11 is set on the bottom portion 93 of the holder 10, and is detachably attached to the bottom portion 93 of the holder 10 through a screw member 11b or the like. The mounting portion 11 may be attached to the holder 10 through engagement such as snap fitting.

The mounting portion 11 as a replacement component may include a plurality of variations in which at least one of an inclination angle $\theta$ of the mounting surface 11a with respect to the bottom surface of the reagent container rack 100 and a height position H1 from the bottom surface of the reagent container rack 100 varies. Thus, replacing the mounting portion 11 allows reagent containers 90 having different dimensions to be disposed at the same height or to be held at optimum inclination angles. For example, even when reagent containers 90 having different heights are set in holders 10, replacing the mounting portion 11 allows the heights of contact positions of the reagent containers 90 with the lid 20 to be uniformed.

As shown in FIG. 8, the lateral portion 12 of the holder 10 is formed so as to extend upward along the outer peripheral surface of the trunk portion 92 of the reagent container 90. Meanwhile, the lateral portion 12 is separated into right and left parts with respect to the front surface of the reagent container 90 set in the holder 10, in other words, two lateral portions are provided on one side and the other side in the horizontal direction. The lateral portion 12a on one side and the lateral portion 12b on the other side are apart from each other at a distance D2 in the horizontal direction to form a clearance in which the front surface of the reagent container 90 is exposed. The identification information of the reagent container 90 is attached to the reagent container 90 in the form of a barcode label LB. When the identification information of the reagent container 90 is disposed between the lateral portion 12a and the lateral portion 12b, the identification information can be read by the reagent reading unit 184 disposed outside the reagent container rack 100.

When being located at the closed position P1, the lid 20 is disposed at an upward position apart from the lateral portion 12 by a distance D3. Therefore, a clearance of the distance D3 between the lid 20 and the lateral portion 12 extends in the circumferential direction of the reagent container 90 and causes the side surface of the reagent container 90. Thus, the support portion 30 of the reagent container rack 100 connect the holder 10 and the lid 20 at positions apart from each other such that the front surface and the side surface of the reagent container 90 are exposed between the holder 10 and the lid 20. The specimen analyzer 200 stores the reagent container 90 on the reagent table 180 at a temperature different from the room temperature. Then, if the greater part of the reagent container 90 is covered with the lid 20 and the holder 10 of the reagent container rack 100, heat transfer is impeded, which causes the reagent in the reagent container 90 to be delayed in reaching a set temperature. In contrast, when the front surface and the side surface of the reagent container 90 are exposed between the holder 10 and the lid 20, a wide area of the reagent container 90 is exposed to the outside from the reagent container rack 100 in the space outside the lid 20 while the lid 20 covers the mouth portion 91 of the reagent container 90, thereby inhibiting heat transfer from being impeded. As a result, the temperature of the reagent in the reagent container 90 is allowed to quickly reach the set temperature while inhibiting evaporation of the reagent.

The lateral portion 12 is provided with an attachment area 13 to which a barcode label of identification information of the reagent container rack 100 is attached. The attachment area 13 is provided on the lateral portion 12a. Therefore, the barcode label LB of the reagent container 90 and the barcode label LB of the reagent container rack 100 are arranged side by side.

<Opening/Closing of Cover Portion>

Next, opening/closing of the cover portion 25 when a reagent is sucked will be described.

Figure 11:
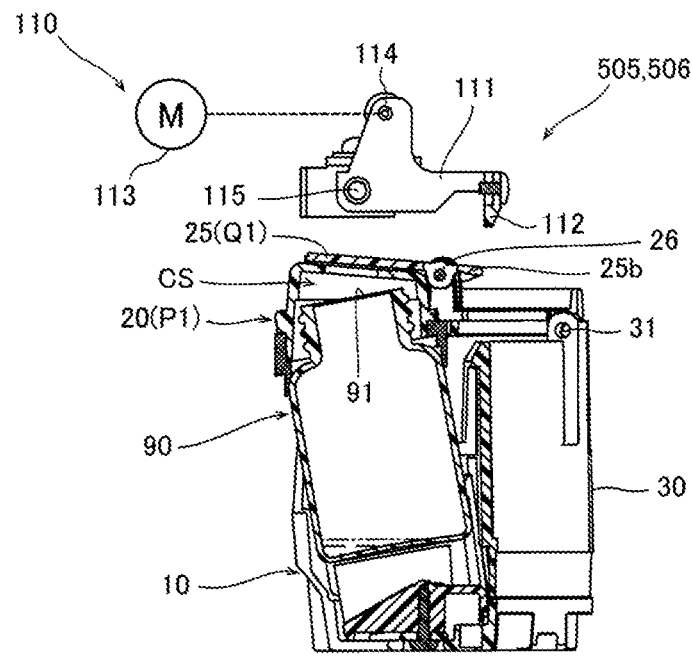
FIG. 11 is a schematic diagram showing a state where an open/close mechanism closes a cover portion.
Figure 12:
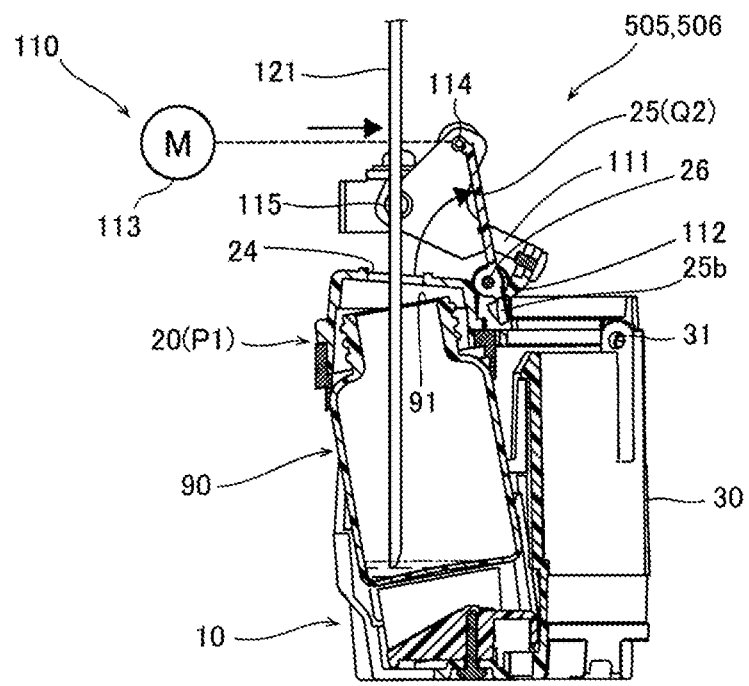
FIG. 12 is a schematic diagram showing a state where the open/close mechanism opens the cover portion.
Figure 13:
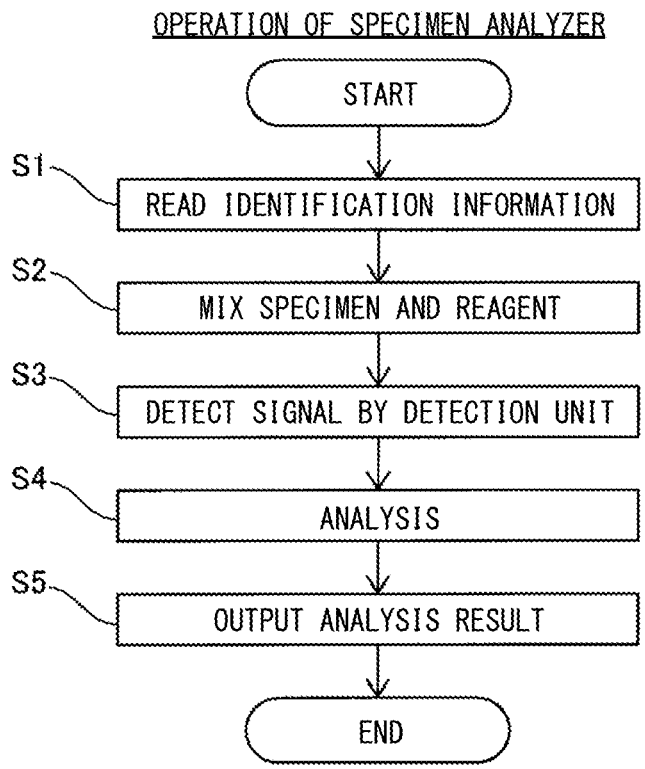
FIG. 13 is a flowchart showing an analysis operation of the specimen analyzer.

As shown in FIG. 11 and FIG. 12, when the suction tube 121 of the reagent dispenser 120 sucks a reagent from a reagent container 90, the open/close mechanism 110 moves the cover portion 25 to open/close the insertion port 24 of the lid 20, thereby opening/closing the lid 20. Thus, suction of the reagent with the suction tube 121 can be performed by locally opening only the insertion port 24 by use of the open/close mechanism 110 while the airtight space CS is formed between the mouth portion 91 and the lid 20 of the reagent container rack 100. After the suction of the reagent, only the insertion port 24 is locally closed by the open/close mechanism 110 while the mouth portion 91 is covered with the lid 20, thereby again forming the airtight space CS. Therefore, as compared to the structure in which the whole lid 20 is removed from the reagent container 90 to open the mouth portion 91 when suction of the reagent is performed, the inside of the reagent container 90 is inhibited from being opened to the outside, thereby inhibiting evaporation of the reagent.

When suction of the reagent is performed, firstly, the reagent table 180 (refer to FIG. 4) moves the reagent container rack 100 such that the reagent container 90 is disposed at the reagent suction position 505 or 506 where the open/close mechanism 110 is disposed. At this time, the lid 20 is disposed at a position directly below the open/close mechanism 110.

The cover portion 25 has a to-be-pressed part 25b (see FIG. 9 to FIG. 11) at a position on the opposite side from the insertion port 24 across the second hinge 26. As shown in FIG. 12, when the open/close mechanism 110 presses the to-be-pressed part 25b as a power point toward the holder 10, a moment acts with the second hinge 26 being a fulcrum, and a part of the cover portion 25 on the insertion port 24 side pivots upward, whereby the insertion port 24 is opened.

The open/close mechanism 110 includes a rotary shaft 115, an arm 111 that rotates around the rotary shaft 115, a pressing piece 112 provided at a tip of the arm 111, and a drive source 113 that drives the arm 111. The drive source 113 is connected to the arm 111 via a link at a position out of the rotary shaft 115. The drive source 113 is, for example, an electric motor. The drive source 113 causes a connection part 114 between itself and the arm 111 to be advanced/retreated in the horizontal direction via a link. When the connection part 114 of the drive source 113 is advanced, the arm 111 rotates around the rotary shaft 115, and the pressing piece 112 presses the to-be-pressed part 25b of the cover portion 25. When the pressing piece 112 presses down the to-be-pressed part 25b against the urging force of the urging member 27, the cover portion 25 is pivoted to the opened position Q2 (refer to FIG. 12). When the open/close mechanism 110 returns the pressing piece 112 to the position shown in FIG. 11, the cover portion 25 is returned to the closed position Q1 by the urging force of the urging member 27.

As shown in FIG. 10 and FIG. 12, the cover portion 25 is configured to pivot around the second hinge 26 disposed at a position nearer to a distal end of the lid 20 relative to the first hinge 31 of the lid 20, when the to-be-pressed part 25b is pressed toward the holder 10 side. That is, the second hinge 26 is disposed at a position between the first hinge 31 of the lid 20 and a distal end portion (i.e., the loop portion 29) of the lid 20 in the radial direction from the first hinge 31. Therefore, the pressing force applied from the pressing piece 112 to the lid 20 acts in a direction in which the lid 20 is rotated around the first hinge 31 toward the reagent container 90 (i.e., a direction toward the closed position P1), and therefore, the lid 20 is not moved toward the opened position P2 by the pressing force. Thus, when the to-be-pressed part 25b is pressed toward the holder 10 to open the cover portion 25, the pressing force can be caused to act in the direction in which the lid 20 is rotated around the first hinge 31 toward the holder 10. Therefore, even when the cover portion 25 is opened and closed, airtightness between the lid 20 and the reagent container 90 is not degraded.

The open/close mechanism 110 causes the cover portion 25 to be located at the closed position Q1 (refer to FIG. 11) when suction of the reagent is not performed. That is, pressing by the pressing piece 112 is not performed. The open/close mechanism 110 causes the cover portion 25 to be located at the opened position Q2 by use of the pressing piece 112 (refer to FIG. 12) when suction of the reagent is performed.

(Operation of Specimen Analyzer)

Next, the operation of the specimen analyzer 200 shown in FIG. 4 to FIG. 12 will be described with reference to FIG.

Figure 14:
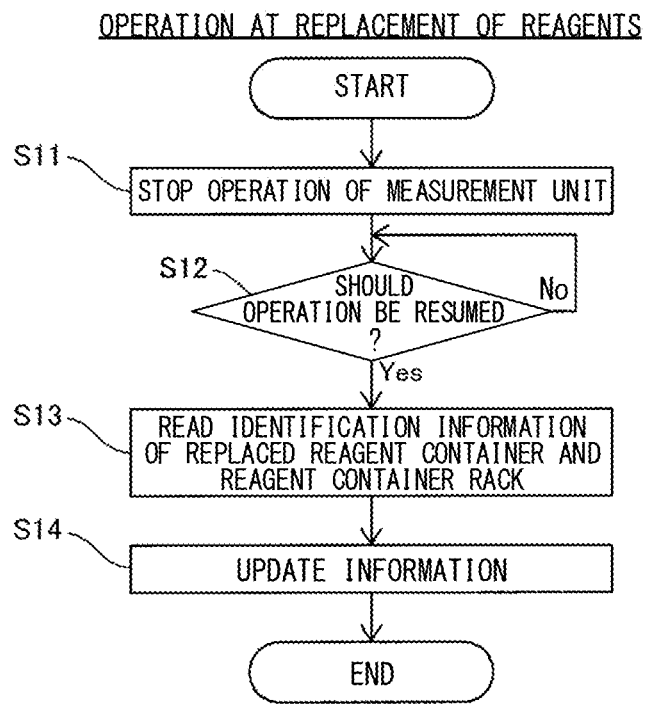
FIG. 14 is a flowchart showing an operation of the specimen analyzer at the time of replacement of reagents.

13 and FIG. 14. The operation of the specimen analyzer 200 is controlled by the control unit 210.

In step S1, the control unit 210 controls reading of identification information. The control unit 210 causes the reagent table 180 to rotate so that the barcode label LB (refer to FIG. 8) in which identification information of each reagent container 90 is recorded and the barcode label LB in which identification information of each reagent container rack 100 is recorded are sequentially disposed at the readout position of the reagent reading unit 184. The control unit 210 causes the reagent reading unit 184 to read the identification information from the barcode labels LB sequentially disposed at the readout position. Thus, the types and positions of the individual reagent container racks 100 on the reagent table 180 and the types and positions of the individual reagent containers 90 on the reagent table 180 are obtained by the control unit 210.

When a specimen container 104 is set and analysis is started, the control unit 210, in step S2, performs control to prepare a measurement sample by mixing a specimen with a reagent. The control unit 210 causes the transporting unit 102 to move the specimen container 104 to the specimen suction position 501 or 502, and causes the specimen dispenser 151 or 152 to dispense the specimen from the specimen container 104 into a reaction chamber 108 placed on the rotatable table 160.

Further, the control unit 210 causes the reagent table 180 to move a reagent container 90 according to a measurement item to the reagent suction position 505 or 506, and causes the reagent dispenser 120a or 120b to dispense a reagent from the reagent container 90 to the reaction chamber 108. At this time, if the reagent container 90 from which the reagent is to be sucked is set in a reagent container rack 100 having a lid 20, the control unit 210 causes the open/close mechanism 110 to operate so that the cover portion 25 of the lid 20 is moved from the closed position Q1 (refer to FIG. 11) to the opened position Q2 (refer to FIG. 12). The control unit 210 causes the reagent dispenser 120 to operate so that the suction tube 121 is inserted into the reagent container 90 through the insertion port 24 of the lid 20 and the opening of the mouth portion 91 of the reagent container 90, and sucks the reagent. Then, the control unit 210 causes the suction tube 121 to move to the outside of the reagent container 90 and the insertion port 24 and dispense the sucked reagent into a reaction chamber 108 containing a specimen to be analyzed. When the suction tube 121 moves to the outside of the insertion port 24, the control unit 210 causes the open/close mechanism 110 to operate so that pressing of the cover portion 25 of the lid 20 is canceled. The urging force of the urging member 27 causes the cover portion 25 to move to the closed position Q1.

Further, according to the measurement item, the control unit 210 causes the gripping mechanism 175 to transfer the reaction chamber 108 to the rotatable table 190, and causes the reaction chamber 108 to be heated on the rotatable table 190. Through the heating, the specimen and the reagent in the reaction chamber 108 are heated to a predetermined reaction temperature. Reagent dispensing is performed one or more times depending on the measurement item. For example, when the measurement item is ATIII, the control unit 210 causes an enzyme reagent to be dispensed from a reagent container 90 held by a holder 10a of a reagent container rack 100 into a reaction chamber 108. Then, the control unit 210 causes the reaction chamber 108 to be heated on the rotatable table 190 at a predetermined temperature for a predetermined time period. Thereafter, the control unit 210 causes a substrate to be dispensed from a reagent container 90 held by a holder 10b of the reagent container rack 100 into the reaction chamber 108. Thus, a measurement sample is prepared.

In step S3, the control unit 210 causes the detection unit 130 to detect a signal based on the specimen. The control unit 210 causes the gripping mechanism 170 to transfer the reaction chamber 108 containing the measurement sample to a chamber setting portion 131 of the detection unit 130. Then, the control unit 210 causes the light transmitter 133 to irradiate the reaction chamber 108 with light for measurement, and causes the light receiver 132 to receive transmitted light. The control unit 210 causes an electric signal according to the amount of light received by the light receiver 132 to be transmitted to the analysis unit 140 as a detection signal of the detection unit 130. The control unit 210 causes the detection of the transmitted light to be continued for a predetermined measurement time.

In step S4, the analysis unit 140 performs analysis based on the signal from the detection unit 130. For example, when the measurement item is ATIII, the analysis unit 140 obtains an amount of change in absorbance on the basis of the signal according to the amount of light detected over the predetermined measurement time by the detection unit 130. The analysis unit 140 obtains activity of the ATIII on the basis of the obtained amount of change in absorbance as well as information about a reference value or a calibration curve obtained from a detection result of a reference specimen.

In step S5, the analysis unit 140 outputs the analysis result. For example, the analysis unit 140 causes the display unit 230 to display the analysis result. Further, the analysis unit 140, for example, records the analysis result and outputs the analysis result to a host computer that is network-connected thereto. Thus, the analysis operation of the specimen analyzer 200 is completed.

(Operation for Reagent Replacement)

As the analysis is continued, the remaining amount of the reagent in the reagent container 90 decreases, and replacement of the reagent may be needed. In this case, the user temporarily stops the operation of the measurement unit 101 of the specimen analyzer 200 to perform a reagent replacement work.

In step S11 in FIG. 14, the control unit 210 temporarily stops the operation of the measurement unit 101 in response to, for example, an operation input performed by the user. When the operation of the measurement unit 101 is stopped, the user performs the reagent replacement work. In a case where replacement of a reagent container 90 set in a reagent container rack 100 is performed, the user takes out the reagent container rack 100 held on the reagent table 180 from the reagent table 180, presses the grip portion 40 to cancel engagement of the lid 20, and moves the lid 20 from the closed position P1 (refer to FIG. 8) to the opened position P2 (refer to FIG. 7). The user takes out the reagent container 90 set in the holder 10a, and replaces the reagent container 90 with a newly unsealed reagent container 90. The user moves the lid 20 from the opened position P2 to the closed position P1 at which the engagement portion 41 is engaged with the loop portion 29 of the lid 20. This engagement allows the contact part 23 of the lid 20 to come into contact with the reagent container 90, whereby an airtight space CS is formed. The user sets the reagent container rack 100 on the reagent table 180. Since the lid 20 covers the mouth portion 91 of the reagent container 90 across the airtight space CS, the reagent is prevented from adhering to the lid 20. Therefore, even when replacement of the reagent container 90 is performed without replacement or washing of the lid 20, the risk of reagent contamination is avoided, and thus reagent replacement can be quickly performed.

In step S12, the control unit 210 determines whether or not to resume the operation of the measurement unit 101. Upon receiving an input operation instructing resumption of the operation of the measurement unit 101 from the user who has finished the reagent replacement work, the control unit 210 resumes the operation of the measurement unit 101. In step S13, the control unit 210 controls reading of identification information of the new reagent container 90 and identification information of the reagent container rack 100 that holds the reagent container 90. The control unit 210 causes the reagent table 180 to rotate so that the barcode label LB of the target reagent container 90 and the barcode label LB of the target reagent container rack 100 are sequentially disposed at the readout position of the reagent reading unit 184. The control unit 210 causes the reagent reading unit 184 to read the identification information from the barcode labels LB sequentially disposed at the readout position.

In step S14, the control unit 210 causes the information of the reagent container 90 placed on the reagent table 180 to be updated by the newly read identification information. Thus, reagent replacement is performed.

Experimental Result

Next, the result of an experiment performed to confirm the reagent evaporation inhibition effect of the reagent container rack 100 according to the present embodiment will be described.

The experiment for confirming the evaporation inhibition effect was performed as follows. That is, for a reference specimen, a new reagent container 90 was set on the reagent table 180 of the specimen analyzer 200, and analysis was started immediately after unsealing of the new reagent container 90 (elapsed time: 0), and an analysis result at the start of the experiment was obtained as a reference value. Thereafter, with the reagent container 90 kept on the reagent table 180, analysis of the reference specimen was periodically performed at predetermined time intervals to obtain divergence degrees (%) from the reference value.

Figure 16:
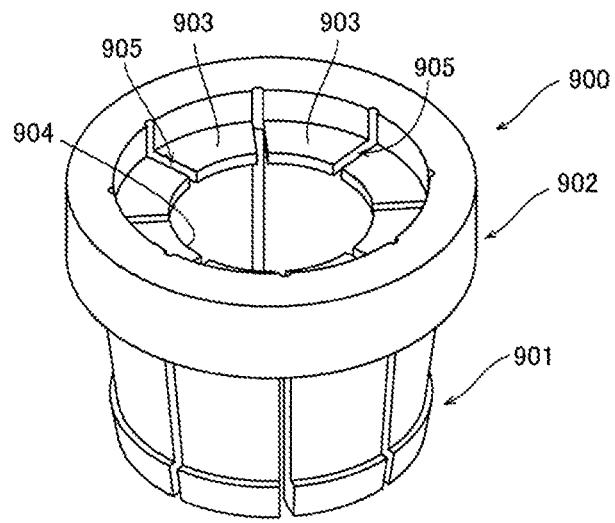
FIG. 16 is a diagram showing the conventional art.

The experiment was performed in a plurality of cases adopting different methods for storing the reagent container 90 while the analysis was performed at the predetermined time intervals. That is, the experiment was performed in four cases including: Example in which the reagent container 90 was stored by use of the lid 20 of the reagent container rack 100 according to the present embodiment; Comparative Example 1 in which the reagent container 90 was left in the unsealed state; Comparative Example 2 in which the reagent container lid body 900 shown in FIG. 16, which is described in Japanese Patent No. 4829624, was attached to the opening of the mouth portion 91 of the reagent container 90 to be stored; and Comparative Example 3 in which the reagent container 90 was hermetically sealed and stored by use of the cap 95 (refer to FIG. 2A) except when suction of the reagent was performed for analysis. The experiment was performed for analysis of ATIII as a measurement item. That is, experimental results regarding an enzyme reagent for ATIII were collected. The analysis results were obtained immediately after unsealing, 72 hours after unsealing, 114 hours after unsealing, 120 hours after unsealing, 144 hours after unsealing, and 162 hours after unsealing.

Figure 15:
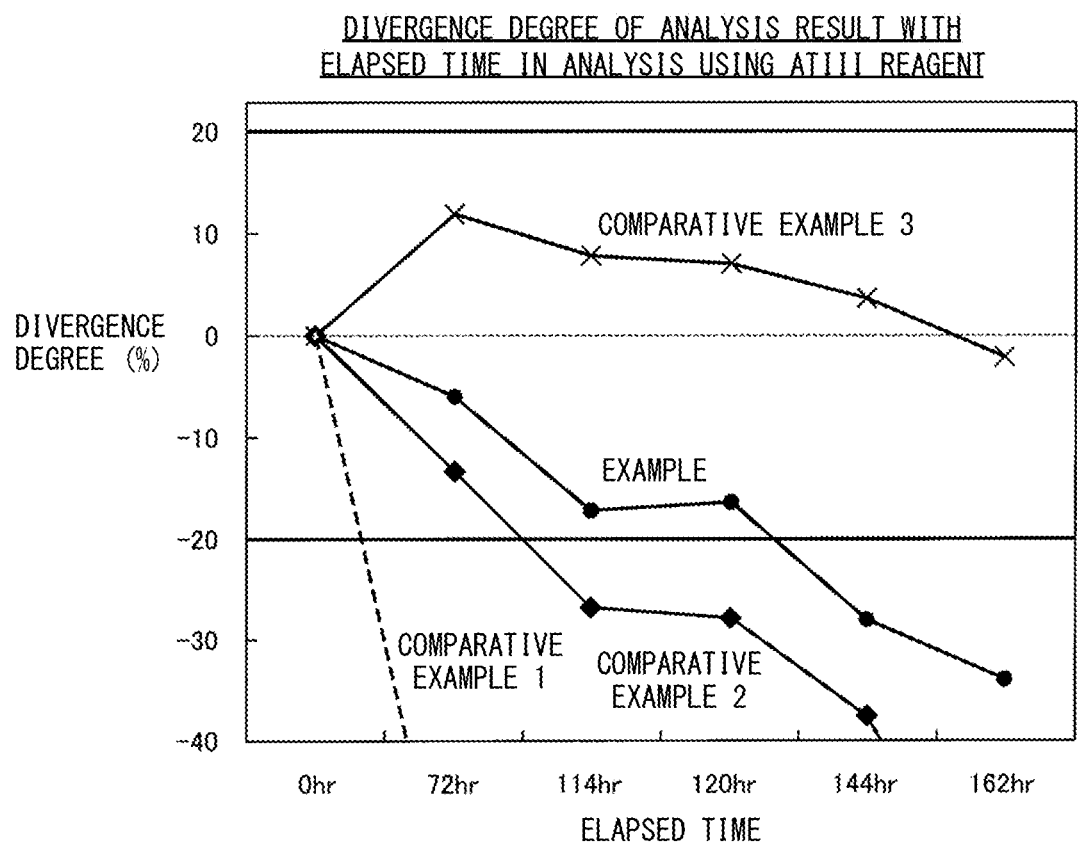
FIG. 15 shows the result of an experiment regarding change in a divergence degree of an analysis result with respect to an elapsed time after unsealing of a reagent container.

FIG. 15 is a graph showing the experimental results. In the graph, the horizontal axis represents the elapsed time (time) and the vertical axis represents the divergence degree (%) from the reference value. As a measure for an allowable range of the divergence degree, ±20% with respect to the reference value is set.

As shown in FIG. 15, in Comparative Example 1 in which the reagent container 90 was left in the unsealed state, the divergence degree was lower than a lower limit value (−40%) of the graph when 72 hours had elapsed after unsealing. In Comparative Example 2 in which the reagent container lid body 900 (refer to FIG. 16) was attached to the reagent container 90, the divergence degree was lower than the allowable range when 114 hours had elapsed. In Example in which the reagent container 90 was stored with the airtight space CS formed by the lid 20 of the reagent container rack 100 shown in FIG. 10, the divergence degree was within the allowable range until 120 hours had elapsed. In this example, the divergence degree was lower than the allowable range when 144 hours had elapsed. In Comparative Example 3 in which the reagent container 90 was hermetically sealed each time suction was performed, the divergence degree was within the allowable range even when 162 hours had elapsed.

From the above, it is confirmed that the reagent container rack 100 of the present embodiment can inhibit evaporation of a reagent more, and inhibit adverse effect of evaporation on the analysis results over longer hours, as compared to the conventional technique (Comparative Example 2).

From the result according to Example that the divergence degree was within the allowable range even after 120 hours had elapsed, it is found that the reagent can be continuously used with the reagent container 90 being continuously set in the specimen analyzer 200 over five days, for example, from Monday to Friday in a week. Thus, the frequency of the reagent replacement work by the user can be reduced, thereby enhancing convenience of the user.

The embodiment disclosed herein is merely illustrative in all aspects and should not be considered as being restrictive. The scope of the present invention is defined not by the description of the above embodiment but by the scope of the claims, and is intended to include meaning equivalent to the scope of the claims and all changes within the scope.

What is claimed is:

1. A reagent container rack used in a specimen analyzer configured to analyze a specimen by use of a reagent in a reagent container, wherein the reagent container comprises a tubular trunk having a space where the reagent is contained and a tubular mouth portion connected to the tubular trunk, where a diameter of the tubular trunk is greater than a diameter of the tubular mouth portion, the reagent container rack comprising:
 a holder sized to hold the reagent container that contains the reagent;
 a tubular lid sized to receive the tubular mouth portion of the reagent container, the tubular lid comprising a top surface and a tubular side wall extending away from a peripheral edge of the top surface to a lower end, wherein an internal diameter of the tubular side wall is greater than the diameter of the tubular mouth portion; and
 a support that connects the holder and the tubular lid, the support comprising a pivot point to move the tubular lid between being spaced away from the reagent container in an open position and the lower end of the tubular side wall being around the tubular mouth portion in contact with the reagent container in a closed position.

2. The reagent container rack of claim 1, wherein
in the closed position, the lower end of the tubular side wall is positioned, by the support around the tubular mouth portion such that an inner surface of the tubular lid circumferentially surrounds and is separated by a gap from an outer surface of the tubular mouth portion defining the diameter of the tubular mouth portion.

3. The reagent container rack of claim 1, wherein
the lower end of the tubular side wall in contact with the reagent container is formed of an elastic material, and is formed in an annular shape.

4. The reagent container rack of claim 1, wherein the tubular lid is sized to receive the tubular mouth portion of the reagent container in a cavity formed by the tubular lid, and in the closed position, the tubular lid creates in the cavity an airtight space between the tubular lid and an opening end surface of the tubular mouth portion in which an opening of the reagent container is formed and, the tubular mouth portion further comprises an engagement area to engage with a cap, the cap sized to seal the opening end surface when engaged with the engagement area.

5. The reagent container rack of claim 4, wherein the engagement area of the tubular mouth portion includes a screw thread that threadedly engages with the cap.

6. The reagent container rack of claim 1, wherein the tubular lid is sized to cover the tubular mouth portion without being in contact with the tubular mouth portion.

7. The reagent container rack of claim 1, wherein, the tubular lid is sized to receive the tubular mouth portion of the reagent container in a cavity formed by the tubular lid, and, in the closed position, the tubular side wall is in contact with an outer surface of the reagent container around the tubular mouth portion received in the cavity such that an airtight space is formed between the tubular lid and the tubular mouth portion.

8. The reagent container rack of claim 1, wherein the support connects the holder and the tubular lid at positions apart from each other such that a front surface and a side surface of the reagent container is exposed between the holder and the tubular lid.

9. The reagent container rack of claim 1, wherein the tubular lid is pivoted by the support to the closed position where the tubular lid covers the tubular mouth portion of the reagent container, and is pivoted to the open position spaced away from the reagent container such that mounting and removal of the reagent container to/from the holder is enabled.

10. The reagent container rack of claim 9, wherein the pivot point comprises a first hinge, wherein the support is connected to the tubular lid via the first hinge such that the tubular lid is pivoted with the first hinge between the closed position and the open position.

11. The reagent container rack of claim 1, wherein the tubular lid comprises an insertion port and a cover, the insertion port sized to receive a suction tube insertable into the reagent, and the cover having an outer shape greater than the insertion port.

12. The reagent container rack of claim 11, wherein the tubular lid comprises a second hinge, the cover pivotally connected to the tubular lid via the second hinge to cover or uncover the insertion port.

13. The reagent container rack of claim 1, wherein the holder comprises a mounting portion sized to receive and support a base of the reagent container that is opposite the tubular mouth portion, and a lateral portion that opposes an outer surface of the tubular trunk of the reagent container and is away from the base.

14. The reagent container rack of claim 13, wherein
the mounting portion of the holder includes an inclined mounting surface on which the reagent container is mountable in an inclined position, and
the tubular lid is sized to receive the tubular mouth portion of the reagent container in a cavity formed by the tubular lid, and, in the closed position the tubular lid forms an airtight space in the cavity between the tubular lid and the tubular mouth portion of the inclined reagent container.

15. The reagent container rack of claim 1, wherein the tubular mouth portion is connected to the tubular trunk by an intermediate portion, the intermediate portion matched to a diameter of the tubular trunk at a first end, and a diameter of the tubular mouth portion at a second end, where the diameter of the tubular trunk is greater than the diameter of the tubular mouth portion.

* * * * *